(12) United States Patent
Cheatham, III et al.

(10) Patent No.: US 10,497,480 B2
(45) Date of Patent: Dec. 3, 2019

(54) PASSIVE REACTIVITY CONTROL IN A NUCLEAR FISSION REACTOR

(71) Applicant: TerraPower, LLC, Bellevue, WA (US)

(72) Inventors: Jesse R. Cheatham, III, Seattle, WA (US); John R. Gilleland, Kirkland, WA (US); Jon D. McWhirter, Kirkland, WA (US)

(73) Assignee: TERRAPOWER, LLC, Bellevue, WA (US)

( * ) Notice: Subject to any disclaimer, the term of this patent is extended or adjusted under 35 U.S.C. 154(b) by 527 days.

(21) Appl. No.: 15/583,091

(22) Filed: May 1, 2017

(65) Prior Publication Data
US 2018/0182498 A1    Jun. 28, 2018

Related U.S. Application Data

(60) Provisional application No. 62/438,323, filed on Dec. 22, 2016.

(51) Int. Cl.
*G21C 7/30* (2006.01)
*G21C 7/02* (2006.01)
(Continued)

(52) U.S. Cl.
CPC .................. *G21C 7/30* (2013.01); *G21C 3/18* (2013.01); *G21C 3/24* (2013.01); *G21C 7/02* (2013.01); *G21C 1/026* (2013.01); *Y02E 30/39* (2013.01)

(58) Field of Classification Search
CPC ........ G21C 1/022; G21C 1/024; G21C 1/026; G21C 7/02; G21C 7/30; G21C 3/044; G21C 3/18; G21C 3/24; G21C 3/28
See application file for complete search history.

(56) References Cited

U.S. PATENT DOCUMENTS

| 2,849,387 | A | * | 8/1958 | Brugmann | ............... G21C 3/04 |
| | | | | | 376/414 |
| 3,085,966 | A | * | 4/1963 | Flora | ....................... G21C 1/04 |
| | | | | | 376/301 |

(Continued)

FOREIGN PATENT DOCUMENTS

| JP | H07151890 A | 6/1995 |
| JP | H0894784 A | 4/1996 |

OTHER PUBLICATIONS

"International Search Report and Written Opinion Issued in PCT Application No. PCT/US2017/030399", dated Sep. 27, 2017, 17 Pages.

*Primary Examiner* — Sharon M Davis
(74) *Attorney, Agent, or Firm* — Jeremy P. Sanders

(57) ABSTRACT

A nuclear reactor includes a passive reactivity control nuclear fuel device located in a nuclear reactor core. The passive reactivity control nuclear fuel device includes a multiple-walled fuel chamber having an outer wall chamber and an inner wall chamber contained within the outer wall chamber. The inner wall chamber is positioned within the outer wall chamber to hold nuclear fuel in a molten fuel state within a high neutron importance region. The inner wall chamber allows at least a portion of the nuclear fuel to move in a molten fuel state to a lower neutron importance region while the molten nuclear fuel remains within the inner wall chamber as the temperature of the nuclear fuel satisfies a negative reactivity feedback expansion temperature condition. A duct contains the multiple-walled fuel chamber and flows a heat conducting fluid through the duct and in thermal communication with the outer wall chamber.

30 Claims, 13 Drawing Sheets

(51) Int. Cl.
*G21C 3/24* (2006.01)
*G21C 3/18* (2006.01)
*G21C 1/02* (2006.01)

(56) References Cited

U.S. PATENT DOCUMENTS

| | | | | |
|---|---|---|---|---|
| 3,291,700 A | * | 12/1966 | Theisen | G21C 3/20 376/412 |
| 3,446,703 A | * | 5/1969 | Lyons | G21C 1/02 376/359 |
| 3,932,217 A | * | 1/1976 | Cachera | G21C 9/02 376/434 |
| 4,022,662 A | * | 5/1977 | Gordon | G21C 3/06 376/416 |
| 4,971,753 A | * | 11/1990 | Taylor, Jr. | G21C 3/18 376/414 |
| 9,183,953 B2 | | 11/2015 | Hyde et al. | |
| 9,362,010 B2 | | 6/2016 | Cheatham, III et al. | |
| 9,767,933 B2 | | 9/2017 | Hyde et al. | |
| 2011/0293060 A1 | | 12/2011 | Hyde et al. | |
| 2011/0293061 A1 | | 12/2011 | Hyde et al. | |

* cited by examiner

High Neutron Importance Region

PASSIVE REACTIVITY CONTROL IN A NUCLEAR FISSION REACTOR

CROSS-REFERENCE TO RELATED APPLICATIONS

The present application claims benefit of priority to U.S. Provisional Patent Application No. 62/438,323, entitled "Passive Reactivity Control in a Nuclear Fission Reactor" and filed on Dec. 22, 2016, which is specifically incorporated by reference herein for all that it discloses or teaches.

BACKGROUND

A fast spectrum nuclear fission reactor ("a fast neutron reactor"), such as a sodium fast reactor, generally includes a reactor vessel containing a nuclear reactor core. The nuclear reactor core includes an array of device locations for placement of fuel assembly devices and other reactor support and control devices. Fissile nuclear fuel within the nuclear reactor core is subjected to neutron collisions that result in fission reactions. In a breed-and-burn fast neutron reactor, a fission chain reaction yields "fast spectrum neutrons" that, in turn, collide with fertile nuclear fuel, thereby transmuting ("breeding") the fertile nuclear fuel into fissile nuclear fuel. Liquid coolant flows through the nuclear reactor core, absorbing thermal energy from the nuclear fission reactions that occur in the nuclear reactor core. The heated coolant then passes to a heat exchanger and a steam generator, transferring the absorbed thermal energy to steam in order to drive a turbine that generates electricity. Design of such nuclear reactors involves combinations of materials, structures, and control systems to achieve desirable operational parameters, including nuclear reactor core stability, efficient thermal generation, long-term structural integrity, etc.

SUMMARY

The described technology provides a fast-acting passive reactivity control nuclear fuel device that functions by thermal expansion of a liquid/molten nuclear fuel under high neutron flux and introduces a negative power feedback for a nuclear fission fast reactor.

A nuclear reactor includes a passive reactivity control nuclear fuel device located in a nuclear reactor core. The passive reactivity control nuclear fuel device includes a multiple-walled fuel chamber including an outer wall chamber and an inner wall chamber contained within the outer wall chamber. The inner wall chamber is positioned within the outer wall chamber to hold nuclear fuel in a molten fuel state within a high neutron importance region of the nuclear reactor core. The inner wall chamber is further configured to allow at least a portion of the nuclear fuel to move in a molten fuel state to a lower neutron importance region of the nuclear reactor core while the molten nuclear fuel remains within the inner wall chamber as the internal temperature of the inner wall chamber satisfies a negative reactivity feedback expansion temperature condition. A duct contains the multiple-walled fuel chamber and flows a heat conducting fluid through the duct and in thermal communication with the outer wall chamber. The heat conducting fluid operates as a coolant, and the flow temperature of the heat conducting fluid is typically less than the temperatures inside the inner wall chamber during a nuclear reaction.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other implementations are also described and recited herein.

BRIEF DESCRIPTIONS OF THE DRAWINGS

DETAILED DESCRIPTIONS

Fast nuclear reactors are typically designed to increase the utilization efficiency of nuclear fuel (e.g., uranium, plutonium, thorium) and to limit moderations of neutrons in fission reactions. In many implementations, fast nuclear reactors can capture significantly more of the energy potentially available in natural uranium, for example, than typical light-water reactors. Nevertheless, the described technology can be employed in different types of nuclear reactors, including light water reactors.

A particular classification of fast nuclear reactor, referred to as a "breed-and-burn" fast reactor, includes a nuclear reactor capable of generating ("breeding") more fissile nuclear fuel than it consumes. For example, the neutron economy is high enough to breed more fissile nuclear fuel from fertile nuclear reactor fuel, such as uranium-238 nuclear or thorium-232 fuel, than it burns. The "burning" is referred to as "burnup" or "fuel utilization" and represents a measure of how much energy is extracted from the nuclear fuel. Higher burnup typically reduces the amount of nuclear waste remaining after the nuclear fission reaction terminates.

Another particular classification of a fast nuclear reactor is based on the type of nuclear fuel used in the nuclear fission reaction. A metal fuel fast nuclear reactor employs a metal nuclear fuel, which has an advantage of high heat conductivity and a faster neutron spectrum than in ceramic-fueled fast reactors. Metal fuels can exhibit a high fissile atom density and are normally alloyed, although pure uranium metal has been used in some implementations. In a fast nuclear reactor, minor actinides produced by neutron capture of uranium and plutonium can be used as a metal fuel. A metal actinide fuel is typically an alloy of zirconium, uranium, plutonium, and minor actinides.

Figure 1:
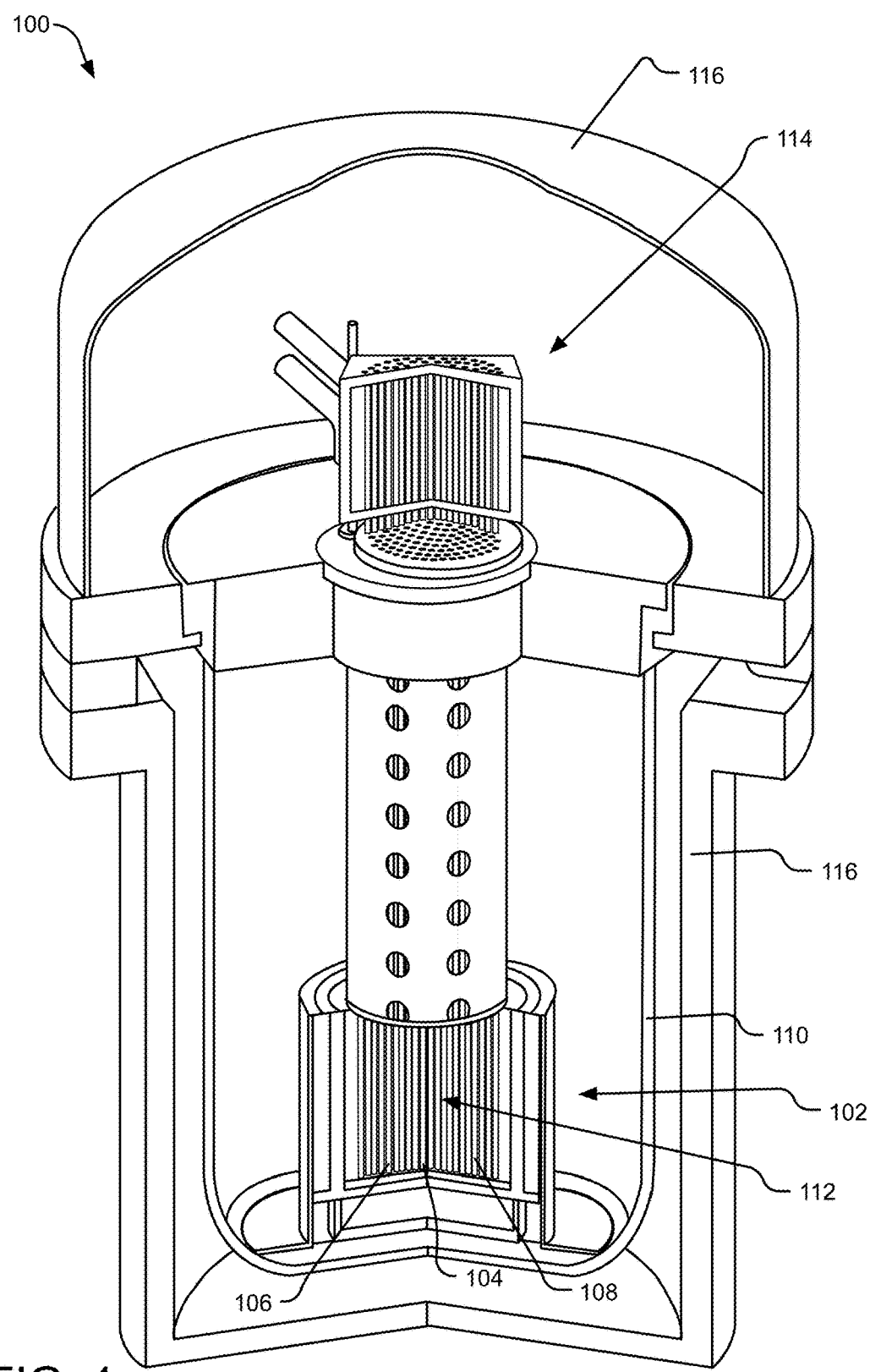
FIG. 1 illustrates a partial-cutaway perspective view of an example nuclear fission reactor with a nuclear reactor core containing a passive reactivity control nuclear fuel device.

FIG. 1 illustrates a partial-cutaway perspective view of an example nuclear fission reactor 100 with a nuclear reactor core 102 containing one or more passive reactivity control nuclear fuel devices, such as a passive reactivity control nuclear fuel device 104. Other elements within the nuclear reactor core 102 include nuclear fuel assembly devices (such as a nuclear fuel assembly device 106) and movable reactivity control assembly devices (such as a movable reactivity control assembly device 108). Certain structures of the example nuclear fission reactor 100 have been omitted, such as coolant circulation loops, coolant pumps, heat exchangers, reactor coolant system, etc., in order to simplify the drawing. Accordingly, it should be understood that the example nuclear fission reactor 100 may include different and/or additional structures not shown in FIG. 1.

Implementations of the example nuclear fission reactor 100 may be sized for any application, as desired. For example, various implementations of the example nuclear fission reactor 100 may be used in low power (~5 Mega Watt thermal) to around 1000 Mega Watt thermal) applications and large power (around 1000 Mega Watt thermal and above) applications, as desired. In one implementation, the example nuclear fission reactor 100 is a fast spectrum nuclear fission reactor having an average neutron energy of greater than or equal to 0.1 MeV, although other configurations are contemplated. It should be understood, however, that the described technology can be employed in different types of nuclear reactors, including light water reactors.

Some of the structural components of the nuclear reactor core 102 may be made of refractory metals, such as tantalum (Ta), tungsten (W), rhenium (Re), or carbon composites, ceramics, or the like. These materials may be selected to address the high temperatures at which the nuclear reactor core 102 typically operates. Structural characteristics of these materials, including creep resistances, mechanical workability, corrosion resistance, etc., may also be relevant to selection. Such structural components define an array of device locations within the nuclear reactor core 102.

The nuclear reactor core 102 is disposed in a reactor vessel 110 containing a pool of heat conducting fluid, such as a coolant. For example, in various implementations, a reactor coolant system (not shown) includes a pool of liquid sodium coolant (not shown) disposed in the reactor vessel 110. In such cases, the nuclear reactor core 102 is submerged in the pool of liquid sodium coolant within the reactor vessel 110. The reactor vessel 110 is surrounded by a containment vessel 116 that helps prevent loss of the liquid sodium coolant in the unlikely case of a leak from the reactor vessel 110. In alternative implementations, liquid coolant can flow through coolant loops throughout the nuclear fission reactor 100.

The nuclear reactor core 102 contains the array of device locations for receiving various reactor core devices, such as nuclear fuel assembly devices, movable reactivity control assembly devices, and passive reactivity control fuel assembly devices within the central core region 112. An in-vessel handling system 114 is positioned near the top of the reactor vessel 110 and is configured, under control of a reactivity control system (not shown), to shuffle individual reactor core devices in and/or out of the device locations within the nuclear reactor core 102. Some reactor core devices may be removable from the nuclear reactor core 102, while other reactor core devices may not be removable from the nuclear reactor core 102.

The nuclear reactor core 102 can include a neutron source and a larger nuclear fission reaction region. The neutron source provides thermal neutrons to initiate a fission reaction in the fissile nuclear fuel. The larger nuclear fission reaction region may contain thorium (Th) or uranium (U) fuel and functions on the general principles of fast neutron spectrum fission breeding.

In one implementation, the nuclear fuel within a nuclear fuel assembly device may be contained within fissile nuclear fuel assembly devices or fertile nuclear fuel assembly devices. The difference between fissile nuclear fuel assembly devices or fertile nuclear fuel assembly devices is effectively the enrichment level of the nuclear fuel, which can change over time within the nuclear reactor core 102. Structurally, fissile nuclear fuel assembly devices or fertile nuclear fuel assembly devices can be identical in some implementations.

The nuclear fuel assembly device 106 in the nuclear reactor core 102 can include a solid hexagonal duct or tube surrounding a plurality of fuel elements, such as fuel pins, which are organized into the nuclear fuel assembly device 106. Non-hexagonal ducts may also be used in some implementations. The ducts in a nuclear fuel assembly device 106 allow coolant to flow past the fuel pins through interstitial gaps between adjacent duct walls. Each duct also allows individual assembly orificing, provides structural support for the fuel bundle, and transmits handling loads from a handling socket to an inlet nozzle. Fuel pins typically consist of multiple nuclear fuel rods (such as uranium, plutonium or thorium) surrounded by a liner and cladding (and sometimes an additional barrier), which prevents radioactive material from entering the coolant stream. Individual pins of a nuclear fuel assembly device 106 in the nuclear reactor core 102 can contain fissile nuclear fuel or fertile nuclear fuel depending on the original nuclear fuel rod material inserted into the pin and the state of breeding within the pin.

The movable reactivity control assembly device 108 can be inserted into and/or removed from the central core region 112 by the in-vessel handling system 114 to provide real-time control of the fission process, balancing the needs of keeping the fission chain reaction active while preventing the fission chain reaction from accelerating beyond control. The state of a fission chain reaction is represented by an effective multiplication factor, k, which indicates the total number of fission events during successive cycles of the chain reaction. When a reactor is in a steady state (i.e., each individual fission event triggers exactly one subsequent fission event), k equals 1. If k>1, the reactor is supercritical and the reaction rate will accelerate. If k<1, the reactor is subcritical and the fission rate will decrease. Conditions within the central core region 112 change over time. Hence, movable reactivity control assemblies may be used to adjust the multiplication factor of the fission chain reaction as conditions change. Such assemblies can be moved to and from different locations in the nuclear reactor core to influence the multiplication factor of the fission chain reaction. In addition, the axial position (e.g., up/down) position of such assemblies can also be adjusted to influence the multiplication factor of the fission chain reaction.

The movable reactivity control assembly device 108 is a highly effective neutron absorbing mechanical structure that can be actively inserted into or removed from the central core region 112 while the fission process is occurring. A movable reactivity control assembly device includes chemical elements of a sufficiently high neutron capture cross-section to absorb neutrons in the energy range of the nuclear fission reaction, as measured by its absorption cross-section. As such, the movable reactivity control assembly device 108 influences the number of neutrons available to cause a fission reaction within the nuclear reactor core 102, thereby controlling the fission rate of the fissile nuclear fuel within the nuclear reactor core 102. Example materials used in movable reactivity control assembly devices of the nuclear fission reactor 100 include without limitation boron carbide or an alloy of silver, indium, and cadmium, europium, or a hafnium-hydride. By controlling the portion of the movable reactivity control assembly device 108 (as well as the number of movable reactivity control assemblies) that interacts with the fission reaction within the central core region 112, the multiplication factor can be tuned to maintain reactor criticality. Accordingly, a movable reactivity control assembly device 108 represents an adjustable parameter for controlling the nuclear fission reaction.

The passive reactivity control nuclear fuel device 104 contains nuclear fuel material in a solid fuel state that can achieve a molten fuel state when the nuclear fuel material temperature exceeds the melting temperature of the nuclear fuel material (e.g., satisfying a nuclear fuel melting temperature condition). Example nuclear fuel material may include fuel salts, eutectics, pure metals, etc. In some implementations, the nuclear fuel material will be alloyed with a bonding/carrier material (e.g., Mg) such that the alloyed nuclear fuel and bonding/carrier material melts at the same temperature and time, although other implementations may involve the nuclear fuel material melting before the bonding/carrier material as temperature rises.

The molten fuel within the passive reactivity control nuclear fuel device 104 can then move within the passive reactivity control nuclear fuel device 104. By moving in and out of a high neutron importance region of the nuclear reactor core 102, the molten nuclear fuel material can increase or decrease, respectively, the reactivity within the nuclear reactor core 102. Neutron importance represents a magnitude of the contribution of a neutron to power generated by a nuclear reactor.

When the molten fuel satisfies a negative reactivity feedback fuel expansion temperature condition (e.g., a temperature high enough to cause the expansion of the nuclear fuel to move a portion of the molten fuel into a lower neutron importance region of the nuclear reactor core 102), the reduction in volume of fissile material in the high neutron importance region provides negative reactivity feedback in the nuclear reactor core 102. For example, when fissile nuclear fuel within the passive reactivity control nuclear fuel device 104 moves into a lower neutron importance region of the nuclear reactor core 102 (such as through thermal expansion of molten fuel as temperature increases), reactivity within the nuclear reactor core 102 decreases.

Movement of the molten fuel within the passive reactivity control nuclear fuel device influences the reactivity of the nuclear reactor core 102. Passive reactivity control nuclear fuel devices can also be moved to and from different locations in the nuclear reactor core 102 to influence the reactivity of the nuclear reactor core 102. In addition, the axial position (e.g., up/down) position of such assemblies can also be adjusted to influence the reactivity of the nuclear reactor core 102.

It should be understood that the molten fuel can also act as a neutron poison within the nuclear reactor. Accordingly, moving molten fuel out of a high neutron importance region and into a lower neutron importance region of a nuclear reactor can also provide some level of positive reactivity feedback. Nevertheless, the passive reactivity control nuclear fuel device 104 can be designed such that the negative reactivity feedback of moving the molten fuel to a lower neutron importance region exceeds the positive reactivity feedback of removing the molten fuel (as a poison) from the high neutron importance region.

In contrast, when the molten fuel no longer satisfies a negative reactivity feedback fuel expansion temperature condition (e.g., a temperature that is no longer high enough to cause the expansion of the nuclear fuel to move a portion of the molten fuel into a lower neutron importance region of the nuclear reactor core 102), the increase in volume of fissile material in the high neutron importance region provides positive reactivity feedback in the nuclear reactor core 102. For example, when fissile nuclear fuel within the passive reactivity control nuclear fuel device 104 moves back into the high neutron importance region of the nuclear reactor core 102 (such as through densification of molten fuel as temperature decreases), reactivity within the nuclear reactor core 102 increases. Accordingly, in one implementation, a passive reactivity control nuclear fuel device, such as the passive reactivity control nuclear fuel device 104, can provide negative feedback to the fission reaction as the temperature of the nuclear fuel material increases and positive feedback to the fission reaction as the temperature of the nuclear fuel material decreases.

Figure 2:
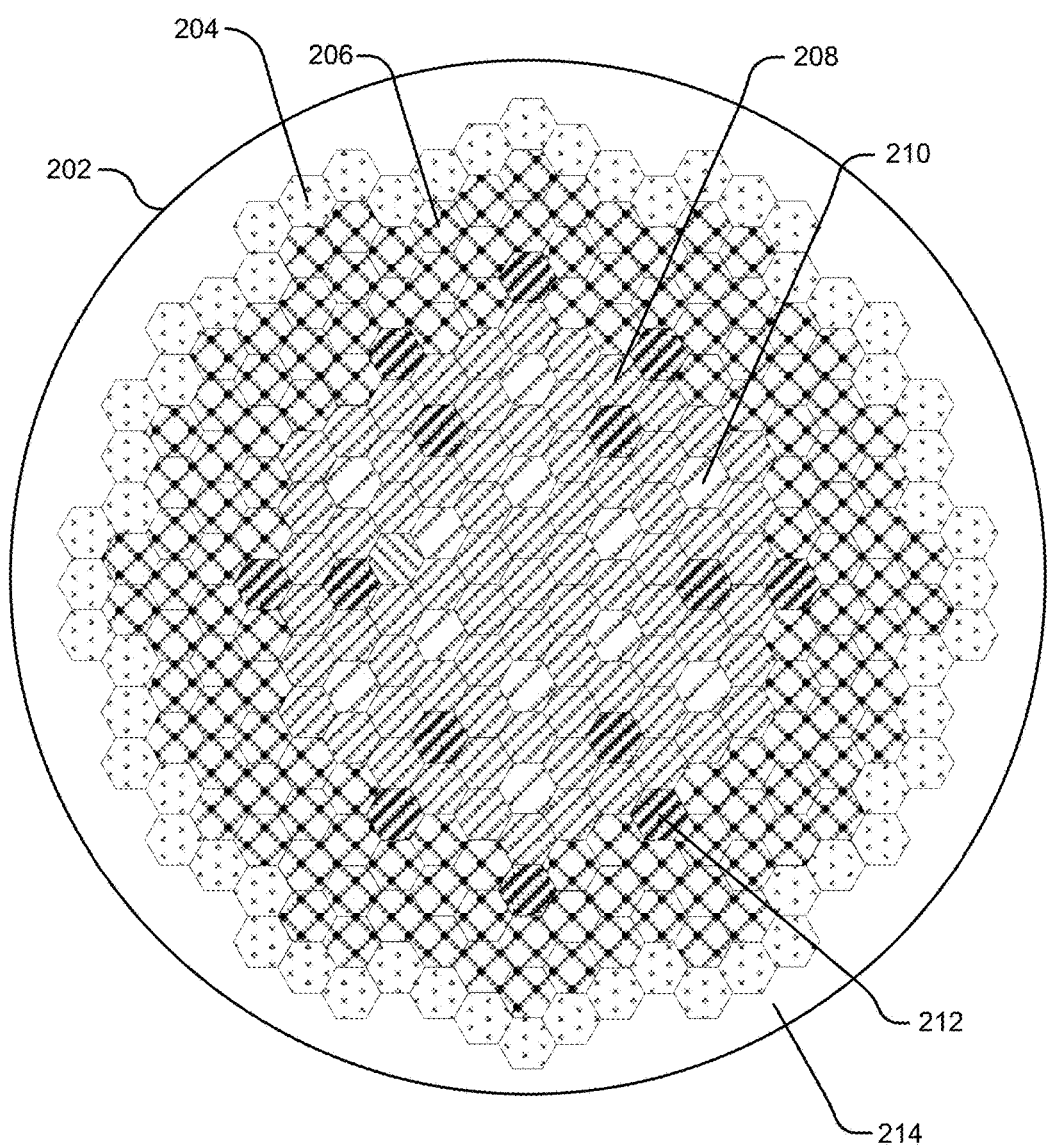
FIG. 2 illustrates a cross-sectional view of an example nuclear reactor core having an array of locations of nuclear reactor core devices, including passive reactivity control assembly devices.

FIG. 2 illustrates a cross-sectional view of an example nuclear reactor core 202 having an array of locations (such as device location 204) of nuclear reactor core devices, including passive reactivity control assembly devices. It should be understood that a fast nuclear reactor core typically has more device locations and devices than shown in the example core of FIG. 2, but a reduced number of device locations and devices is shown to facilitate description and illustration. Each device is inserted into a structurally-defined device location within the array. Reflector devices, such as a replaceable radiation reflector device at the device location 204, and permanent radiation reflector material 214 are positioned at the boundary of the central reactor core region to reflect neutrons back into the central reactor core region.

Nuclear fuel assembly devices, such as a nuclear fuel assembly device 206 and a nuclear fuel assembly device 208, occupy the majority of the device locations in the nuclear reactor core 202. As the nuclear reaction progresses, an atom of fertile nuclear fuel can be converted or transmuted to fissile nuclear fuel by the capture of a neutron within a certain energy range. For example, a fertile nucleus, such as a U-238 nucleus, can capture fast neutrons and be transmuted to a fissile nucleus, such as Pu-239, by beta-decay. Meanwhile, in this case, the Pu-239 nucleus can capture a neutron, resulting in a fission reaction that yields multiple fast neutrons. This neutron multiplication with each fission reaction provides enough neutrons for the transmutation of new fissile nuclear fuel from the fertile nuclear fuel. As such, the fission reaction drives the breeding of new fissile nuclear fuel from fertile nuclear fuel that it consumes. The reactivity of the fission reaction can be controlled to some extent by one or more movable reactivity control assembly devices, such as a movable reactivity control assembly device 210.

By introducing passive reactivity control nuclear fuel devices, such as passive reactivity control nuclear fuel device 212 into the nuclear reactor core 202, the reactivity of the fission reaction can be decreased after the temperature of the nuclear fuel satisfies a negative reactivity feedback expansion temperature condition (e.g., the temperature of the fuel has exceeded a particular temperature threshold) by thermally expanding molten fuel to move into a lower neutron importance region of the nuclear reactor core 202. In contrast, the reactivity of the fission reaction can be increased after the temperature of the nuclear fuel fails to satisfy a negative reactivity feedback expansion temperature condition (e.g., the temperature of the fuel has decreased below a particular temperature threshold) by densification of molten fuel to move back into the high neutron importance region of the nuclear reactor core 202. In one implementation, eighteen passive reactivity control nuclear fuel devices may be employed throughout the nuclear reactor core 202, although different reactor designs may benefit from a greater or lesser number of passive reactivity control nuclear fuel devices.

Figure 3:
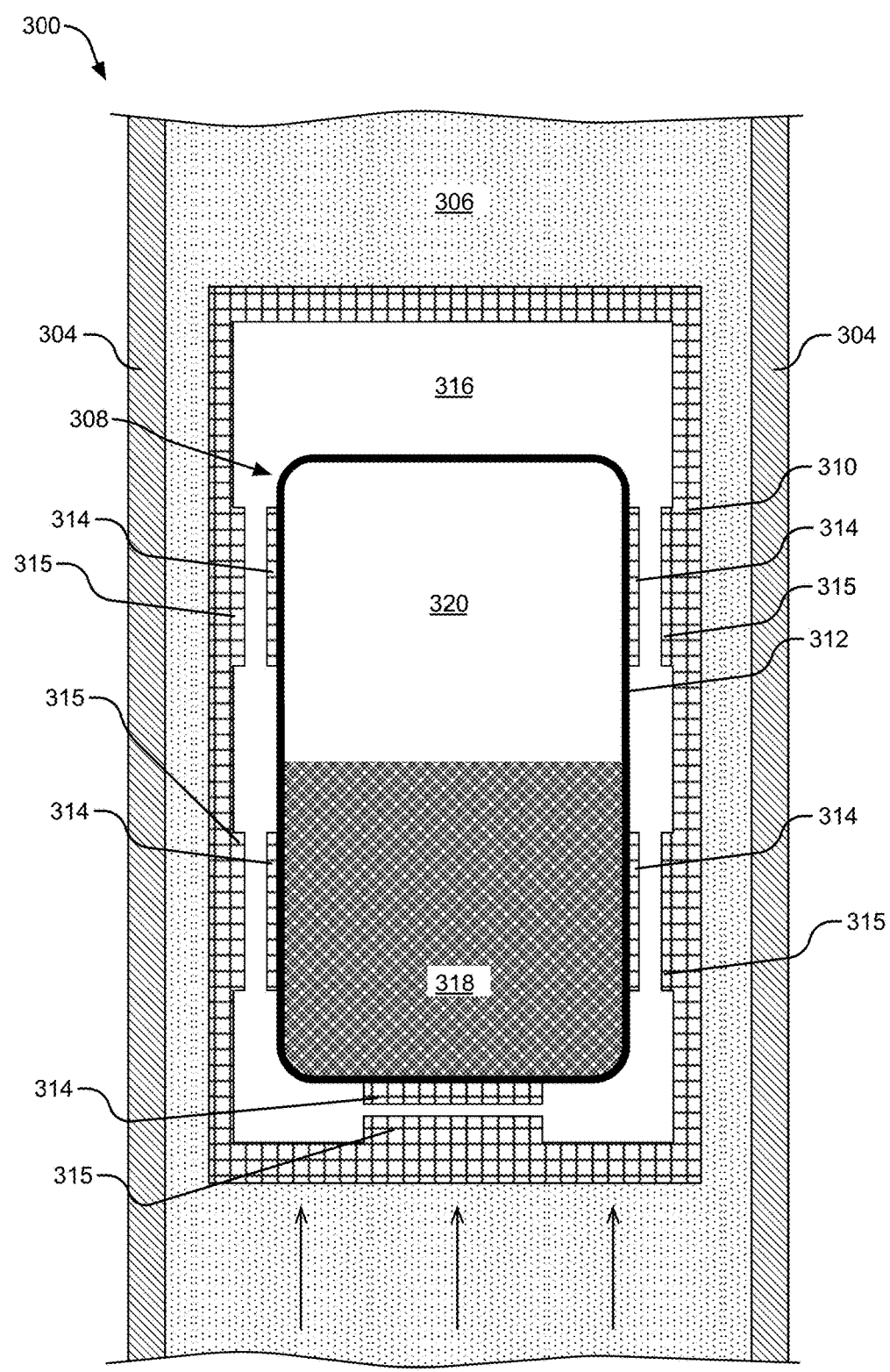
FIG. 3 illustrates a cross-sectional view of an example passive reactivity control nuclear fuel device containing nuclear fuel in a solid fuel state within a high neutron importance region of a nuclear reactor core.

FIG. 3 illustrates a cross-sectional view of an example passive reactivity control nuclear fuel device 300 containing nuclear fuel 318 in a solid fuel state within a high neutron importance region of a nuclear reactor core. The passive reactivity control nuclear fuel device 300 includes a duct 304 through which a heat conducting fluid (e.g., coolant 306, such as molten sodium) can flow. The duct 304 may be manufactured from HT9 stainless steel although other materials may be employed.

The duct 304 also contains a multiple-walled fuel chamber 308, which is an example of a multiple-walled fuel chamber. In one implementation, an outer wall chamber 310 of the multiple-walled fuel chamber 308 primarily includes HT9 stainless steel, although other materials may be employed, at least in part. Further, in one implementation, an inner wall chamber 312 of the multiple-walled fuel chamber 308 primarily includes molybdenum, although other materials may be employed, at least in part. In one implementation, the inner wall chamber 312 is fitted with one or more thermally conductive contacts 314, which may also be formed from HT9 stainless steel or other materials. The contacts 314 can improve thermal communication between the inner wall chamber 312 and the outer wall chamber 310 (and therefore, the coolant 306) as one or more of the contacts 314 approach and/or physically contact the outer wall chamber 310. Corresponding contacts 315 on the interior of the outer wall chamber 310 may also be provided, as shown. The gap region 316 between the inner wall chamber 312 and the outer wall chamber 310 may contain a vacuum or a gas, such as a tag gas that can be detected if the outer wall chamber 310 mechanically fails and potentially compromises the molten fuel storage. The gap region 316 between the outer wall chamber 310 and the inner wall chamber 312 thermally isolates the inner wall chamber 312, such as from thermal communication with the coolant. The flow temperature of the heat conducting fluid or coolant is typically less than the temperatures inside the inner wall chamber during a nuclear reaction.

The multiple-walled fuel chamber 308 contains nuclear fuel 318 within the inner wall chamber 312. In the state shown in FIG. 3, the nuclear fuel 318 is in an initial state (e.g., at reactor start-up or initial insertion into the nuclear reactor core). In one implementation, the nuclear fuel 318 is in a solid porous form including a combination of fertile nuclear fuel and a bonding material (which may or may not be neutronically translucent). For example, the bonding material may perform as a nuclear translucent carrier medium (e.g., when melted). In FIG. 3, the nuclear fuel 318 remains in a solid state because the temperature of the nuclear fuel 318 has not exceeded its melting temperature (e.g., not satisfying a nuclear fuel melting temperature condition). Other example forms of the nuclear fuel materials may include without limitation a solid non-porous slug, a powder, a slurry, and a suspension. For example, the fertile nuclear fuel may include $^{238}$U (uranium), such as a uranium foam, and the bonding material may include magnesium (Mg). Other material types and structures may be employed. (In some implementations, the nuclear fuel 318 may also include a quantity of fissile nuclear fuel, such as $^{239}$Pu (plutonium), particularly if the passive reactivity control nuclear fuel device 300 is intended to undergo fission early in its life cycle (e.g., at startup).) In a breed-and-burn fast reactor, however, the fertile nuclear fuel can eventually be transmuted into fissile nuclear fuel that can undergo fission.

A plenum region 320 is also located within the inner wall chamber 312 to receive gaseous fission products as well as molten fuel as the fuel temperature rises and the fuel material expands into the plenum or plenum region 320. As shown, at least a portion of the plenum region 320 is located outside the high neutron importance region. Thus, as molten fuel expands into the plenum region 320 (and out of the high neutron importance region), reactivity in the nuclear reactor core decreases.

One method of increasing the internal temperature of the nuclear fuel 318 involves initiating and sustaining a nuclear fission reaction within the example passive reactivity control nuclear fuel device 300. Within the nuclear reactor core, neutrons within the nuclear reactor core can collide with fissile nuclear fuel residing within the example passive reactivity control nuclear fuel device 300 to produce a nuclear fission reaction sufficient to increase the internal temperature of the example passive reactivity control nuclear fuel device 300 to exceed the melting temperature of the bonding material. Once the bonding material is melted into a carrier material, the fissile nuclear fuel can go into solution with the carrier material to provide a fissile nuclear fuel solution (the molten fuel). Other methods of increasing the temperature of the nuclear fuel 318 may be employed.

Figures 4A, 4B:
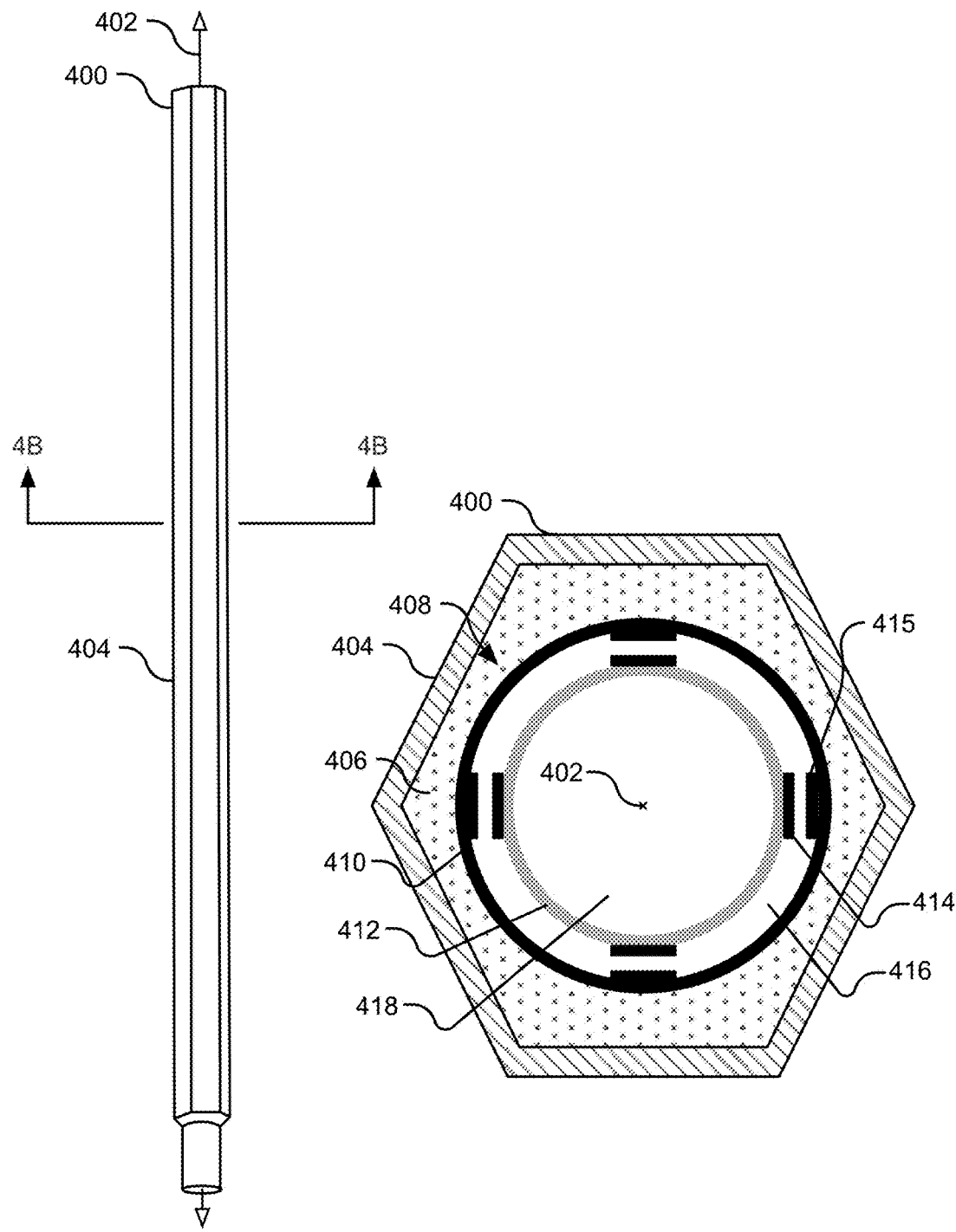
FIG. 4A illustrates a perspective view of a passive reactivity control nuclear fuel device along a long axis.
FIG. 4B illustrates a cross-sectional view of the passive reactivity control nuclear fuel device along the long axis.

FIG. 4A illustrates a perspective view of a passive reactivity control nuclear fuel device 400 along a long axis 402, and FIG. 4B illustrates a cross-sectional view of the passive reactivity control nuclear fuel device 400 along the long axis 402. In one implementation, an outer structural wall 404 of the passive reactivity control nuclear fuel device 400 forms a duct for containing a flow of coolant 406, such as liquid sodium. The outer structure wall 404 of the duct may be manufactured from HT9 stainless steel, although other materials may be employed.

Within the outer structural wall 404 is located a multiple-walled fuel chamber 408 having an outer wall chamber 410 and an inner wall chamber 412. In one implementation, an outer wall chamber 410 of the multiple-walled fuel chamber 408 primarily includes HT9 stainless steel, although other materials may be employed, at least in part. Further, in one implementation, an inner wall chamber 412 of the multiple-walled fuel chamber 408 primarily includes molybdenum, although other materials may be employed, at least in part. In one implementation, the inner wall chamber 412 is fitted with one or more thermally conductive contacts, such as contact 414, which may also be formed from HT9 stainless steel or other materials. The contacts 414 can improve thermal communication between the inner wall chamber 412 and the outer wall chamber 410 (and therefore, the coolant 406) as one or more of the contacts 414 approach and/or physically contact the outer wall chamber 410. Corresponding contacts, such as contact 415, on the interior of the outer wall chamber 410 may also be provided, as shown. The gap region 416 between the inner wall chamber 412 and the outer wall chamber 410 may contain a vacuum or a gas, such as a tag gas that can be detected if the outer wall chamber 410 mechanically fails and potentially compromises the molten fuel storage. The gap region 416 between the outer wall chamber 410 and the inner wall chamber 412 thermally isolates the inner wall chamber 412, such as from thermal communication with the coolant. The flow temperature of the heat conducting fluid or coolant is typically less than the temperatures inside the inner wall chamber during a nuclear reaction.

The inner wall chamber 412 contains nuclear fuel 418. In one implementation, the nuclear fuel 418 is in a solid porous form including a combination of fertile nuclear fuel and a bonding material. For example, the fertile nuclear fuel may include $^{238}$U (uranium), such as a uranium foam, and the bonding material may include magnesium (Mg). Other material types and structures may be employed. (In one implementation of this initial state, the nuclear fuel 418 may also include a quantity of fissile nuclear fuel, such as $^{239}$Pu (plutonium), particularly if the passive reactivity control nuclear fuel device 400 is intended to undergo fission early in its life cycle (e.g., at startup).) In a breed-and-burn fast reactor, however, the fertile nuclear fuel can eventually be transmuted into fissile nuclear fuel that can undergo fission.

Figure 5:
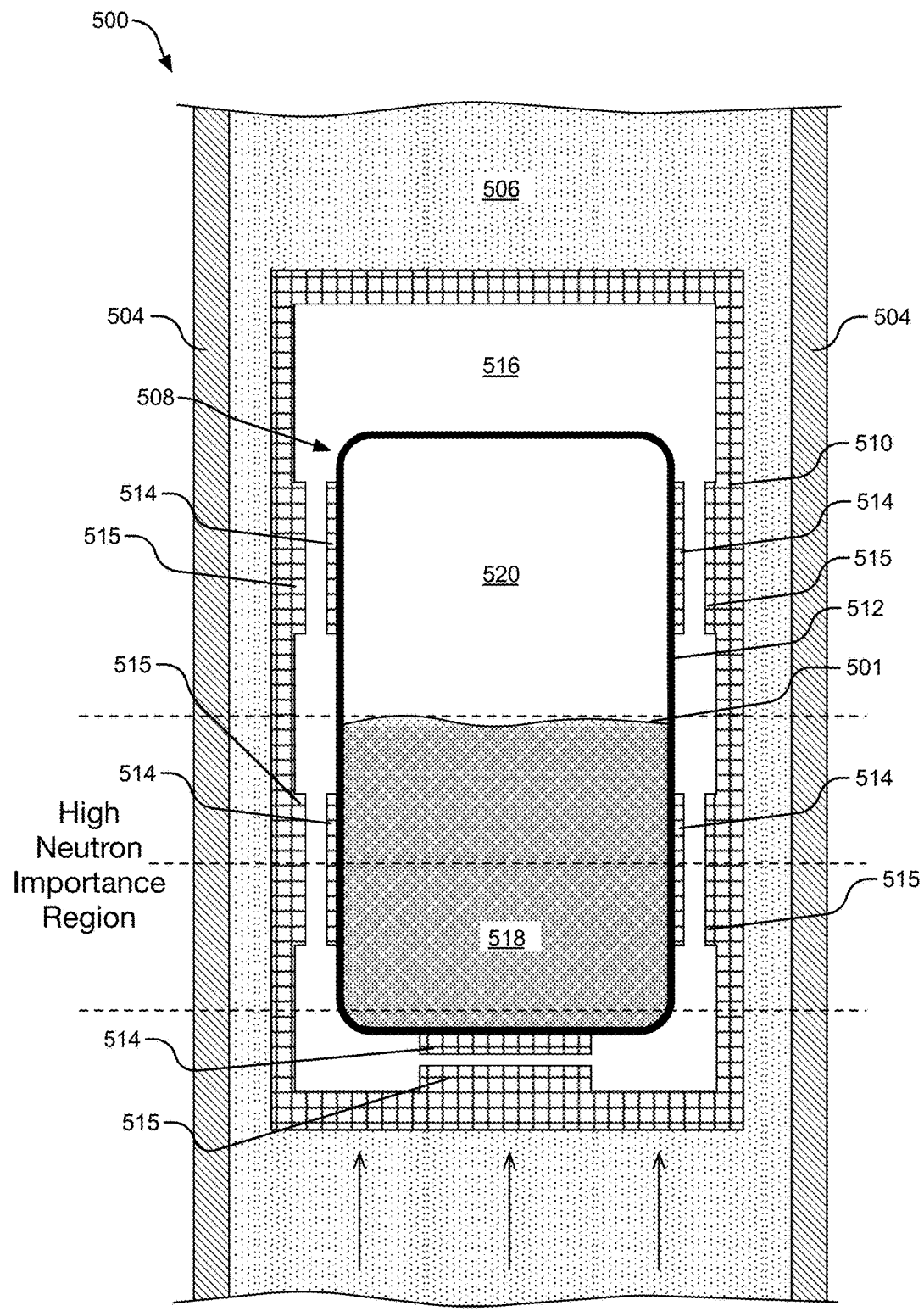
FIG. 5 illustrates a cross-sectional view of an example passive reactivity control nuclear fuel device containing molten fuel within a high neutron importance region of a nuclear reactor core.

FIG. 5 illustrates a cross-sectional view of an example passive reactivity control nuclear fuel device 500 containing molten fuel 501 within a high neutron importance region of a nuclear reactor core. A solid porous fuel slug as nuclear fuel 518 resides in the example passive reactivity control nuclear fuel device 500, such that the molten fuel 501 can pass through the pores of the nuclear fuel 518. The passive reactivity control nuclear fuel device 500 includes a duct 504 through which coolant 506, such as molten sodium, can flow. The duct 504 may be manufactured from HT9 stainless steel although other materials may be employed.

The duct 504 also contains a multiple-walled fuel chamber 508. In one implementation, an outer wall chamber 510 of the multiple-walled fuel chamber 508 primarily includes HT9 stainless steel, although other materials may be employed, at least in part. Further, in one implementation, an inner wall chamber 512 of the multiple-walled fuel chamber 508 primarily includes molybdenum, although other materials may be employed, at least in part. In one implementation, the inner wall chamber 512 is fitted with one or more thermally conductive contacts 514, which may also be formed from HT9 stainless steel or other materials. The contacts 514 can improve thermal communication between the inner wall chamber 512 and the outer wall chamber 510 (and therefore, the coolant 506) as one or more of the contacts 514 approach and/or physically contact the outer wall chamber 510. Corresponding contacts 515 on the interior of the outer wall chamber 510 may also be provided, as shown. The gap region 516 between the inner wall chamber 512 and the outer wall chamber 510 may contain a vacuum or a gas, such as a tag gas that can be detected if the outer wall chamber 510 mechanically fails and potentially compromises the molten fuel storage. The gap region 516 between the outer wall chamber 510 and the inner wall chamber 512 thermally isolates the inner wall chamber 512, such as from thermal communication with the coolant. The flow temperature of the heat conducting fluid or coolant is typically less than the temperatures inside the inner wall chamber during a nuclear reaction.

The multiple-walled fuel chamber 508 contains nuclear fuel 518 within the inner wall chamber 512. In the state shown in FIG. 5, the nuclear fuel 518 is in an intermediate state in which the temperature of the nuclear fuel 518 has exceeded the melting temperature of the nuclear fuel 518 that has caused all or some portion of the nuclear fuel 518 to turn into molten fuel 501 (e.g., a solid portion of the fertile nuclear fuel can remain in a solid state). In one implementation, the nuclear fuel 518 can include a combination of a fissile nuclear fuel and a carrier material or a combination of fertile nuclear fuel, fissile nuclear fuel, and a carrier material. For example, the fertile nuclear fuel may include $^{238}$U (uranium), such as a uranium foam, and the bonding material may include magnesium (Mg), and the fissile nuclear fuel may include $^{239}$Pu (plutonium) in a Mg—Pu solution. Other material types and structures may be employed. In a breed-and-burn fast reactor, however, the fertile nuclear fuel can eventually be transmuted into fissile nuclear fuel that can undergo fission.

It is noted that the nuclear fuel 518 includes solid fertile nuclear fuel and molten fissile fuel (e.g., a solution of fissile nuclear fuel and the carrier material). The molten state of the fissile fuel demonstrates that the temperature of the nuclear fuel 518 has exceeded the melting temperature of the nuclear fuel 518 and the position of the molten fuel 501 within and not outside the high neutron importance region of the nuclear reactor core demonstrates that the temperature of the nuclear fuel 518 has not satisfied the negative reactivity feedback expansion temperature condition.

A plenum region 520 is also located within the inner wall chamber 512 to receive gaseous fission products as well as molten fuel as the fuel temperature rises and the fuel material expands into the plenum or plenum region 520. As shown, at least a portion of the plenum region 520 is located outside the high neutron importance region. Thus, as molten fuel expands into the plenum region 520 (and out of the high neutron importance region), reactivity in the nuclear reactor core decreases.

In one implementation, Mg may be used as the bonding material. Mg has a melting point of about 650° C. In contrast, one configuration of a nuclear reactor includes an inlet coolant temperature of about 360° C., which is generally insufficient to melt the Mg.

The internal temperature of the example passive reactivity control nuclear fuel device 500, and therefore the bonding material, can be increased to exceed the melting temperature of Mg, with some buffer to ensure that the Mg is molten. The molten Mg forms a carrier material, which can act as a solvent for fissile nuclear fuel within the example passive reactivity control nuclear fuel device 500, such as $^{239}$Pu, providing a molten fissile nuclear fuel solution (Mg—Pu). One method of increasing the internal temperature of the nuclear fuel 518 involves sustaining a nuclear fission reaction within the example passive reactivity control nuclear fuel device 500. The increased internal temperature of the nuclear fuel 518 can transition the nuclear fuel 518 from a solid fuel state to a molten fuel state.

The fissile nuclear fuel may be initially stored within the inner wall chamber 512 of the example passive reactivity control nuclear fuel device 500. Alternatively, or additionally, the fissile nuclear fuel may breed up from the solid porous fertile nuclear fuel by fast neutrons resulting from fission reactions elsewhere within the operating nuclear reactor core.

Figure 6:
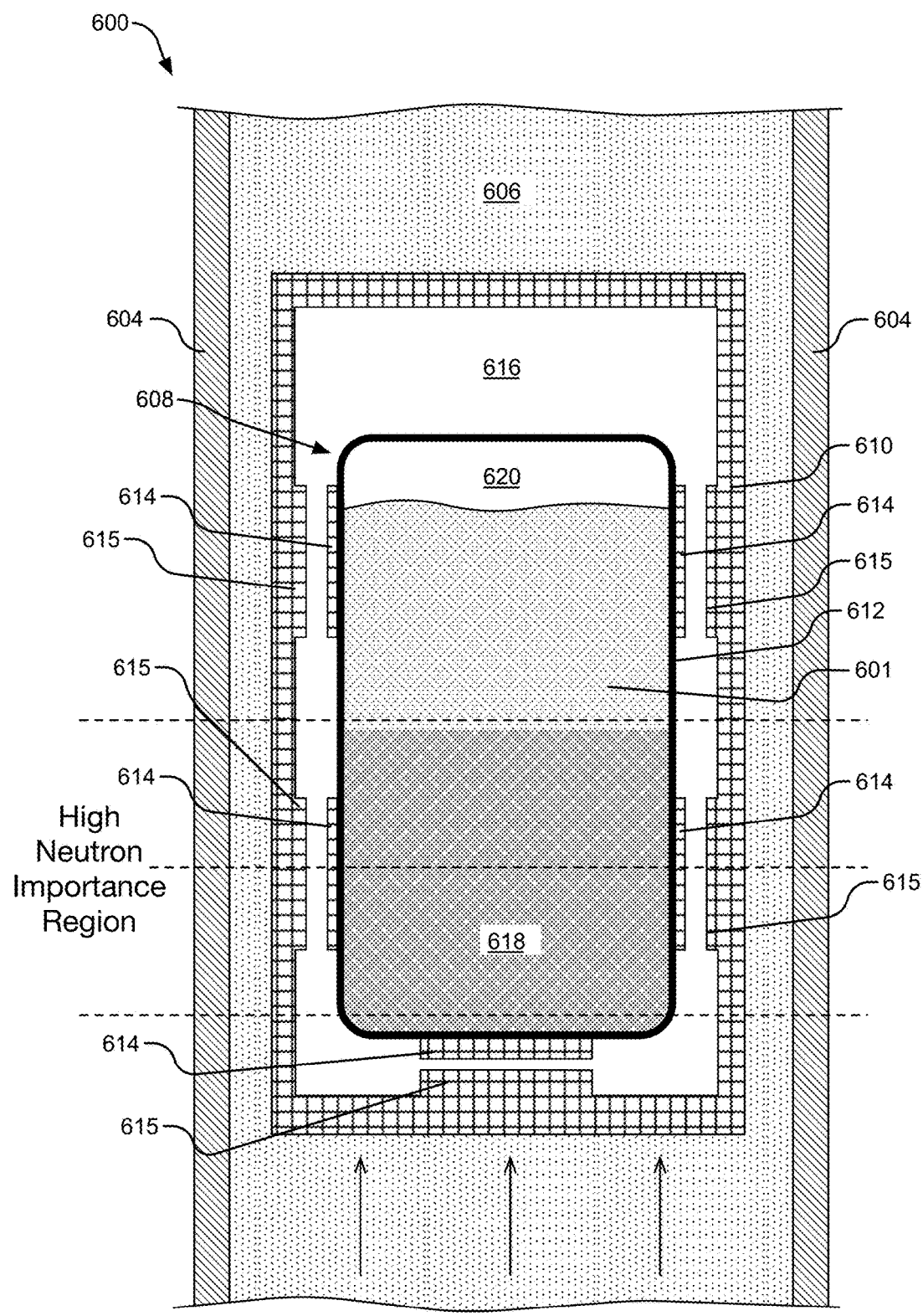
FIG. 6 illustrates a cross-sectional view of an example passive reactivity control nuclear fuel device containing molten fuel expanding outside a high neutron importance region of a nuclear reactor core.

FIG. 6 illustrates a cross-sectional view of an example passive reactivity control nuclear fuel device 600 containing molten fuel 601 expanding outside a high neutron importance region of a nuclear reactor core. A solid porous fuel slug as nuclear fuel 618 also resides in the example passive reactivity control nuclear fuel device 600, such that the molten fuel 601 can pass through the pores of the nuclear fuel 618. The passive reactivity control nuclear fuel device 600 includes a duct 604 through which coolant 606, such as molten sodium, can flow. The duct 604 may be manufactured from HT9 stainless steel although other materials may be employed.

The duct 604 also contains a multiple-walled fuel chamber 608. In one implementation, an outer wall chamber 610 of the multiple-walled fuel chamber 608 primarily includes HT9 stainless steel, although other materials may be employed, at least in part. Further, in one implementation, an inner wall chamber 612 of the multiple-walled fuel chamber 608 primarily includes molybdenum, although other materials may be employed, at least in part. In one implementation, the inner wall chamber 612 is fitted with one or more thermally conductive contacts 614, which may also be formed from HT9 stainless steel or other materials. The contacts 614 can improve thermal communication between the inner wall chamber 612 and the outer wall chamber 610 (and therefore, the coolant 606) as one or more of the contacts 614 approach and/or physically contact the outer wall chamber 610. Corresponding contacts 615 on the interior of the outer wall chamber 610 may also be provided, as shown. The gap region 616 between the inner wall chamber 612 and the outer wall chamber 610 may contain a vacuum or a gas, such as a tag gas that can be detected if the outer wall chamber 610 mechanically fails and potentially compromises the molten fuel storage. The gap region 616 between the outer wall chamber 610 and the inner wall chamber 612 thermally isolates the inner wall chamber 612, such as from thermal communication with the coolant. The flow temperature of the heat conducting fluid or coolant is typically less than the temperatures inside the inner wall chamber during a nuclear reaction.

The multiple-walled fuel chamber 608 contains nuclear fuel 618 within the inner wall chamber 612. In the state shown in FIG. 6, the nuclear fuel 618 is in an intermediate state in which the molten fuel 601 is heated to a high enough temperature that the molten fuel 601 expands within the inner wall chamber 612, into a plenum or plenum region 620, but not enough to cause a large enough increase in temperature to cause the inner wall chamber 612 to thermally expand significantly. In one implementation, the nuclear fuel 618 is in a solid porous form including a combination of fertile nuclear fuel and a bonding material. For example, the fertile nuclear fuel may include $^{238}$U (uranium), such as a uranium foam, and the bonding material may include magnesium (Mg). Other material types and structures may be employed. (In one implementation of this intermediate state, the molten fuel 601 would also include a quantity of fissile nuclear fuel, such as $^{239}$Pu (plutonium) in a Mg—Pu solution.) In a breed-and-burn fast reactor, however, the fertile nuclear fuel can eventually be transmuted into fissile nuclear fuel that can undergo fission.

It is noted that the nuclear fuel 618 includes solid fertile nuclear fuel and molten fissile fuel (e.g., a solution of fissile nuclear fuel and the carrier material). The molten state of the fissile fuel demonstrates that the temperature of the nuclear fuel 618 has exceeded the melting temperature of the nuclear fuel 618 and the position of the molten fuel 601 both within and outside the high neutron importance region of the nuclear reactor core demonstrates that the temperature of the nuclear fuel 601 has satisfied the negative reactivity feedback expansion temperature condition.

The plenum region 620 is also located within the inner wall chamber 612 to receive gaseous fission products as well as molten fuel 601 as the fuel temperature rises and the fuel material expands into the plenum or plenum region 620. As shown, at least a portion of the plenum region 620 is located outside the high neutron importance region. Thus, as molten fuel expands into the plenum region 620 (and out of the high neutron importance region), reactivity in the nuclear reactor core decreases.

Figure 7:
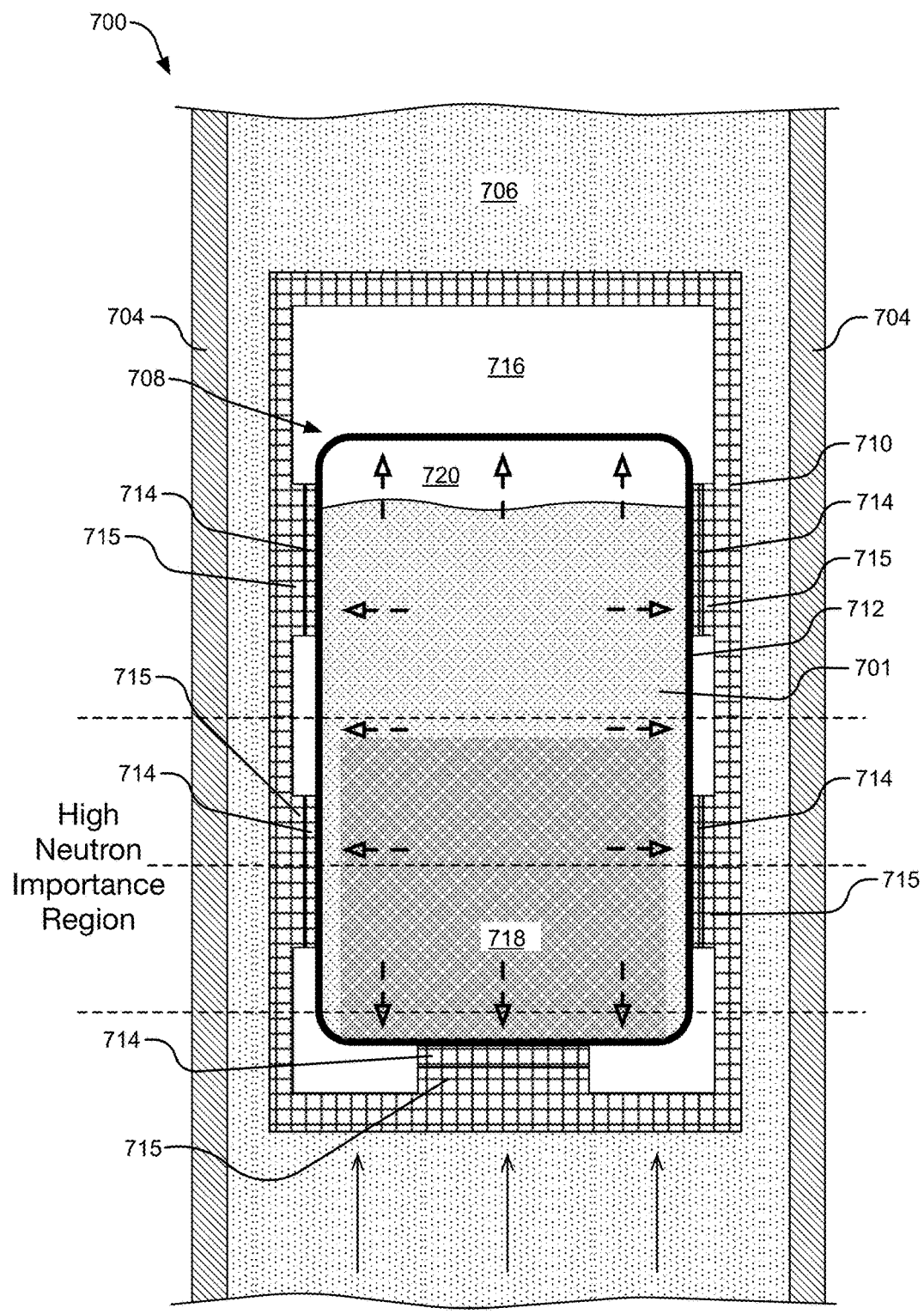
FIG. 7 illustrates a cross-sectional view of an example passive reactivity control nuclear fuel device containing molten fuel expanding outside a high neutron importance region of a nuclear reactor core and expanding an inner wall chamber within which it is contained.

FIG. 7 illustrates a cross-sectional view of an example passive reactivity control nuclear fuel device 700 containing molten fuel 701 expanding outside a high neutron importance region of a nuclear reactor core and expanding an inner wall chamber 712 within which it is contained. A solid porous fuel slug as nuclear fuel 718 also resides in the example passive reactivity control nuclear fuel device 700, such that the molten fuel 701 can pass through the pores of the nuclear fuel 718. The passive reactivity control nuclear fuel device 700 includes a duct 704 through which coolant 706, such as molten sodium, can flow. The duct 704 may be manufactured from HT9 stainless steel although other materials may be employed.

The duct 704 also contains a multiple-walled fuel chamber 708. In one implementation, an outer wall chamber 710 of the multiple-walled fuel chamber 708 primarily includes HT9 stainless steel, although other materials may be employed, at least in part. Further, in one implementation, the inner wall chamber 712 of the multiple-walled fuel chamber 708 primarily includes molybdenum, although other materials may be employed, at least in part. In one implementation, the inner wall chamber 712 is fitted with one or more thermally conductive contacts 714, which may also be formed from HT9 stainless steel or other materials. The contacts 714 can improve thermal communication between the inner wall chamber 712 and the outer wall chamber 710 (and therefore, the coolant 706) as one or more of the contacts 714 approach and/or physically contact the outer wall chamber 710. Corresponding contacts 715 on the interior of the outer wall chamber 710 may also be provided, as shown. The gap region 716 between the inner wall chamber 712 and the outer wall chamber 710 may contain a vacuum or a gas, such as a tag gas that can be detected if the outer wall chamber 710 mechanically fails and potentially compromises the molten fuel storage. The gap region 716 between the outer wall chamber 710 and the inner wall chamber 712 thermally isolates the inner wall chamber 712, such as from thermal communication with the coolant. Nevertheless, as the temperature of the inner wall chamber 712 increases, the inner wall chamber 712 can thermally expand to overcome the thermal isolation. The flow temperature of the heat conducting fluid or coolant is typically less than the temperatures inside the inner wall chamber during a nuclear reaction.

The multiple-walled fuel chamber 708 contains nuclear fuel 718 within the inner wall chamber 712. In the state shown in FIG. 7, the nuclear fuel 718 is in a very high-temperature state, caused by a potential combination of neutron heating, gamma heating, and direction fission of fuel material. At a sufficiently high temperature, the inner wall chamber 712 can thermally expand, such that the walls of the inner wall chamber 712 expand toward the wall of the outer wall chamber 710. In one implementation, the nuclear fuel 718 is in a solid porous form including a combination of fertile nuclear fuel and a bonding material. For example, the fertile nuclear fuel may include $^{238}$U (uranium), such as a uranium foam, and the bonding material may include magnesium (Mg). Other material types and structures may be employed. (In one implementation of this intermediate state, the nuclear fuel 718 would also include a quantity of fissile nuclear fuel, such as $^{239}$Pu (plutonium) in a Mg—Pu solution.) In a breed-and-burn fast reactor, however, the fertile nuclear fuel can eventually be transmuted into fissile nuclear fuel that can undergo fission (e.g., a $^{238}$U fertile nuclear fuel material bred to a $^{239}$Pu fissile nuclear fuel material, which can go into solution with Mg, designated as a Mg—Pu fissile fuel solution).

It is noted that the nuclear fuel 718 includes solid fertile nuclear fuel and molten fissile fuel (e.g., a solution of fissile nuclear fuel and the carrier material). The molten state of the fissile fuel demonstrates that the temperature of the nuclear fuel 718 has exceeded the melting temperature of the nuclear fuel 718, and the position of the molten fuel 701 within and outside the high neutron importance region of the nuclear reactor core demonstrates that the temperature of the molten fuel 701 has satisfied the negative reactivity feedback expansion temperature condition. In addition, the expansion of the inner wall chamber 712 demonstrates that the temperature of the fuel and/or the inner wall chamber 712 satisfy an inner wall chamber expansion condition in a very high-temperature condition. As the temperature of the nuclear fuel 718 decreases, the temperature may no longer satisfy the inner wall chamber expansion condition, such that the thermal expansion rate of the inner wall chamber 712 can also decrease and/or reverse.

A plenum region 720 is also located within the inner wall chamber 712 to receive gaseous fission products as well as molten fuel as the fuel temperature rises and the fuel material expands into the plenum or plenum region 720. As shown, at least a portion of the plenum region 720 is located outside the high neutron importance region. Thus, as molten fuel expands into the plenum region 720 (and out of the high neutron importance region), reactivity in the nuclear reactor core decreases.

In contrast to the state shown in FIG. 6, the state shown in FIG. 7 depicts the molten fuel 701 at a sufficiently high temperature to force the inner wall chamber 712 to expand. In order to avoid mechanical failure of the inner wall chamber 712 when the temperature satisfies an inner wall chamber expansion condition (e.g., causing the inner wall chamber 712 to expand toward the outer wall chamber 710), the expansion moves the contacts 714 of the inner wall chamber 712 toward the contacts 715 of the outer wall chamber 710. As the distance between the contact 714 and 715 decreases (particularly to the point of physical contact), the heat of the molten fuel 701 can radiate or conduct to the outer wall chamber 710, rapidly reducing the temperature of the molten fuel 701, even to the extent that the molten fuel 701 densifies rapidly, reducing the temperature of the molten fuel 701, even potentially to the point of freezing the molten fuel 701 into a solid nuclear fuel slug of nuclear fuel 718. In this manner, an upper limit of the inner wall chamber temperature can be maintained—as the temperature increases, the inner wall chamber 712 thermally expands into radiative or conductive thermal communication with the outer wall chamber 710 and the coolant 706, resulting in a reduction in the temperature of the inner wall chamber 712.

Figure 8:
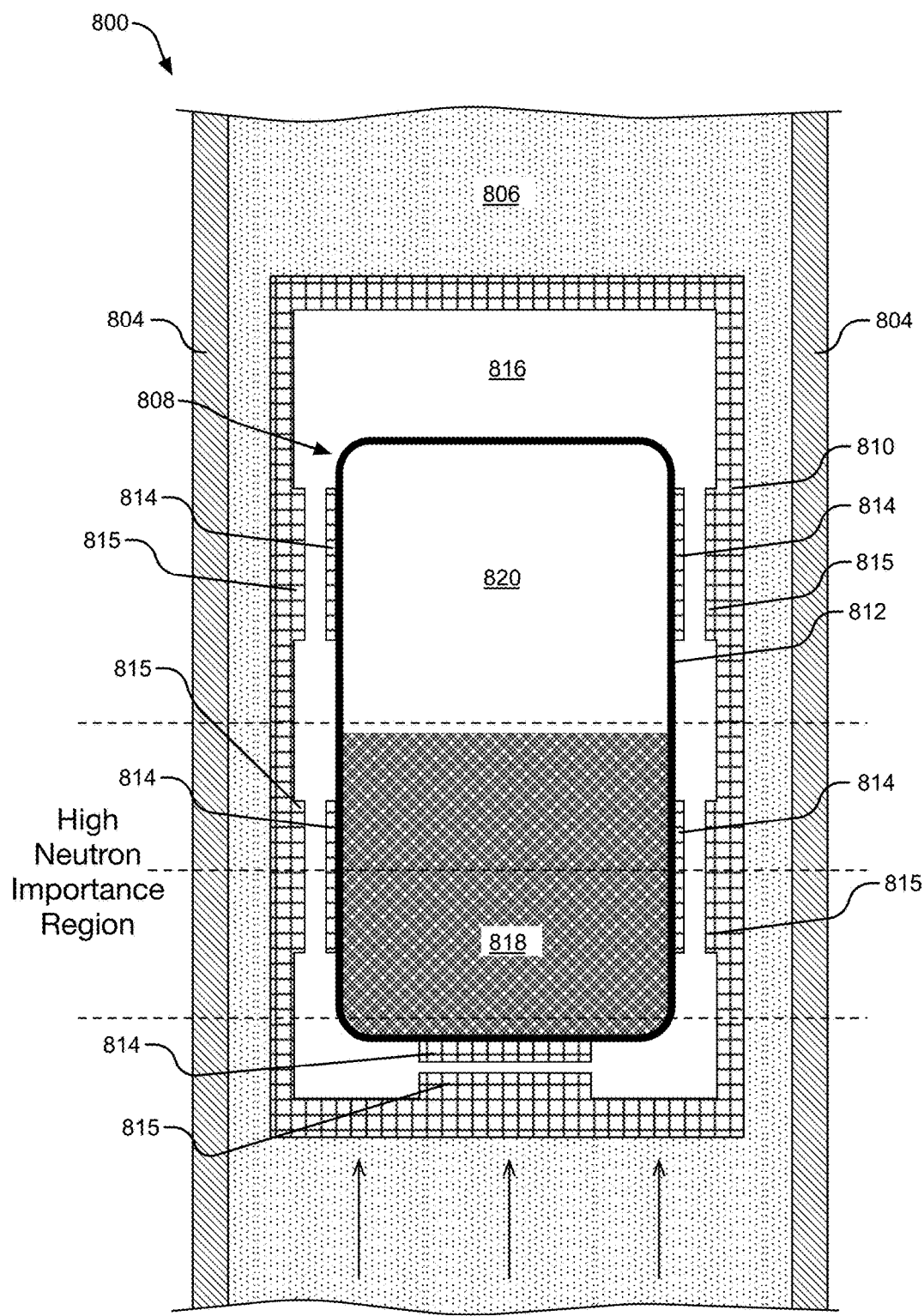
FIG. 8 illustrates a cross-sectional view of an example passive reactivity control nuclear fuel device containing nuclear fuel within a high neutron importance region of a nuclear reactor core after molten fuel has densified.

FIG. 8 illustrates a cross-sectional view of an example passive reactivity control nuclear fuel device 800 containing nuclear fuel 818 within a high neutron importance region of a nuclear reactor core after molten fuel has densified. The passive reactivity control nuclear fuel device 800 includes a duct 804 through which coolant 806, such as molten sodium, can flow. The duct 804 may be manufactured from HT9 stainless steel although other materials may be employed.

The duct 804 also contains a multiple-walled fuel chamber 808. In one implementation, an outer wall chamber 810 of the multiple-walled fuel chamber 808 primarily includes HT9 stainless steel, although other materials may be employed, at least in part. Further, in one implementation, an inner wall chamber 812 of the multiple-walled fuel chamber 808 primarily includes molybdenum, although other materials may be employed, at least in part. In one implementation, the inner wall chamber 812 is fitted with one or more thermally conductive contacts 814, which may also be formed from HT9 stainless steel or other materials. The contacts 814 can improve thermal communication between the inner wall chamber 812 and the outer wall chamber 810 (and therefore, the coolant 806) as one or more of the contacts 814 approach and/or physically contact the outer wall chamber 810. Corresponding contacts 815 on the interior of the outer wall chamber 810 may also be provided, as shown. The gap region 816 between the inner wall chamber 812 and the outer wall chamber 810 may contain a vacuum or a gas, such as a tag gas that can be detected if the outer wall chamber 810 mechanically fails and potentially compromises the molten fuel storage. The gap region 816 between the outer wall chamber 810 and the inner wall chamber 812 thermally isolates the inner wall chamber 812, such as from thermal communication with the coolant. The flow temperature of the heat conducting fluid or coolant is typically less than the temperatures inside the inner wall chamber during a nuclear reaction.

The multiple-walled fuel chamber 808 contains nuclear fuel 818 within the inner wall chamber 812. In the state shown in FIG. 8, the nuclear fuel 818 is in a reset state (e.g., after sufficient heat has been extracted from the nuclear fuel 818 to transition the molten fuel into a solid state, such as nuclear fuel 818). The temperature of the nuclear fuel 818 no longer exceeds the melting temperature of the nuclear fuel 818 and no longer satisfies the negative reactivity feedback expansion temperature condition. In one implementation, the nuclear fuel 818 returns to a solid form including a combination of fertile nuclear fuel, fissile nuclear fuel, and a bonding material. For example, the fertile nuclear fuel may include $^{238}$U (uranium), such as a uranium foam, and the bonding material may include magnesium (Mg). Other material types and structures may be employed. In a breed-and-burn fast reactor, however, the fertile nuclear fuel can eventually be transmuted into fissile nuclear fuel that can undergo fission.

A plenum region 820 is also located within the inner wall chamber 812 to receive gaseous fission products as well as molten fuel as the fuel temperature rises and the fuel material expands into the plenum or plenum region 820. As shown, at least a portion of the plenum region 820 is located outside the high neutron importance region. Thus, as molten fuel expands into the plenum region 820 (and out of the high neutron importance region), reactivity in the nuclear reactor core decreases.

Figure 9:
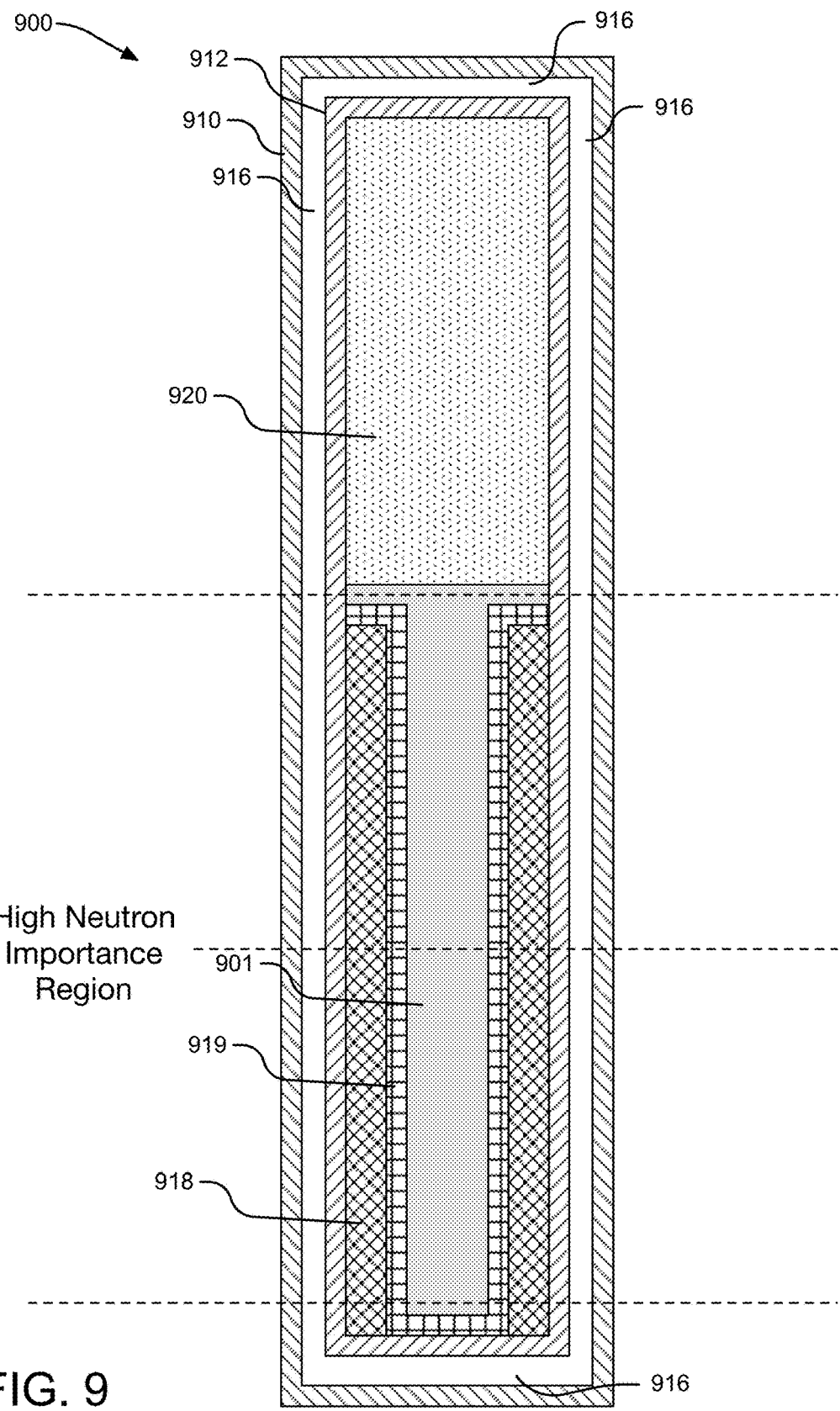
FIG. 9 illustrates a cross-sectional view of an alternative example passive reactivity control nuclear fuel device.

FIG. 9 illustrates a cross-sectional view of an alternative example passive reactivity control nuclear fuel device. The passive reactivity control nuclear fuel device may include a duct (not shown) through which coolant, such as molten sodium, can flow. The duct may be manufactured from HT9 stainless steel although other materials may be employed.

In one implementation, a multiple-walled fuel chamber 900 includes an outer wall chamber 910 of the multiple-walled fuel chamber 900 that primarily includes HT9 stainless steel, although other materials may be employed, at least in part. Further, in one implementation, an inner wall chamber 912 of the multiple-walled fuel chamber 900 primarily includes molybdenum, although other materials may be employed, at least in part. A gap region 916 between the inner wall chamber 912 and the outer wall chamber 910 may contain a vacuum or a gas, such as a tag gas that can be detected if the outer wall chamber 910 mechanically fails and potentially compromises the molten fuel storage. The gap region 916 between the outer wall chamber 910 and the inner wall chamber 912 thermally isolates the inner wall chamber 912, such as from thermal communication with the coolant. The flow temperature of the heat conducting fluid or coolant is typically less than the temperatures inside the inner wall chamber during a nuclear reaction.

The multiple-walled fuel chamber 900 contains fertile nuclear fuel 918 within the inner wall chamber 912, such as $^{238}$U (uranium) in a porous, powdered, or suspension form. The fertile nuclear fuel 918 is separated from the fissile nuclear fuel region containing a liquid metal fuel 901, such as Mg—Pu, by a permeable barrier 919, although liquid metal fuel 901 may reside on either side of the permeable barrier 919. As the fertile nuclear fuel 918 is transmuted into fissile nuclear fuel by fast spectrum neutrons resulting from fission reactions with the nuclear reactor (and potentially from within the multiple-walled fuel chamber 900 itself), the transmuted fissile nuclear fuel diffuses into solution with the liquid metal fuel 901. In the state shown in FIG. 9, the liquid metal fuel 901 is in an intermediate state (e.g., after sufficient heat has been provided to the liquid metal fuel 901 to maintain the molten state of the liquid metal fuel.

A plenum region 920 is also located within the inner wall chamber 912 to receive gaseous fission products as well as molten fuel as the fuel temperature rises and the fuel material expands into the plenum or plenum region 920. As shown, at least a portion of the plenum region 920 is located outside the high neutron importance region of a nuclear reactor core. Thus, as molten fuel expands into the plenum region 920 (and out of the high neutron importance region), reactivity in the nuclear reactor core decreases.

Figure 10:
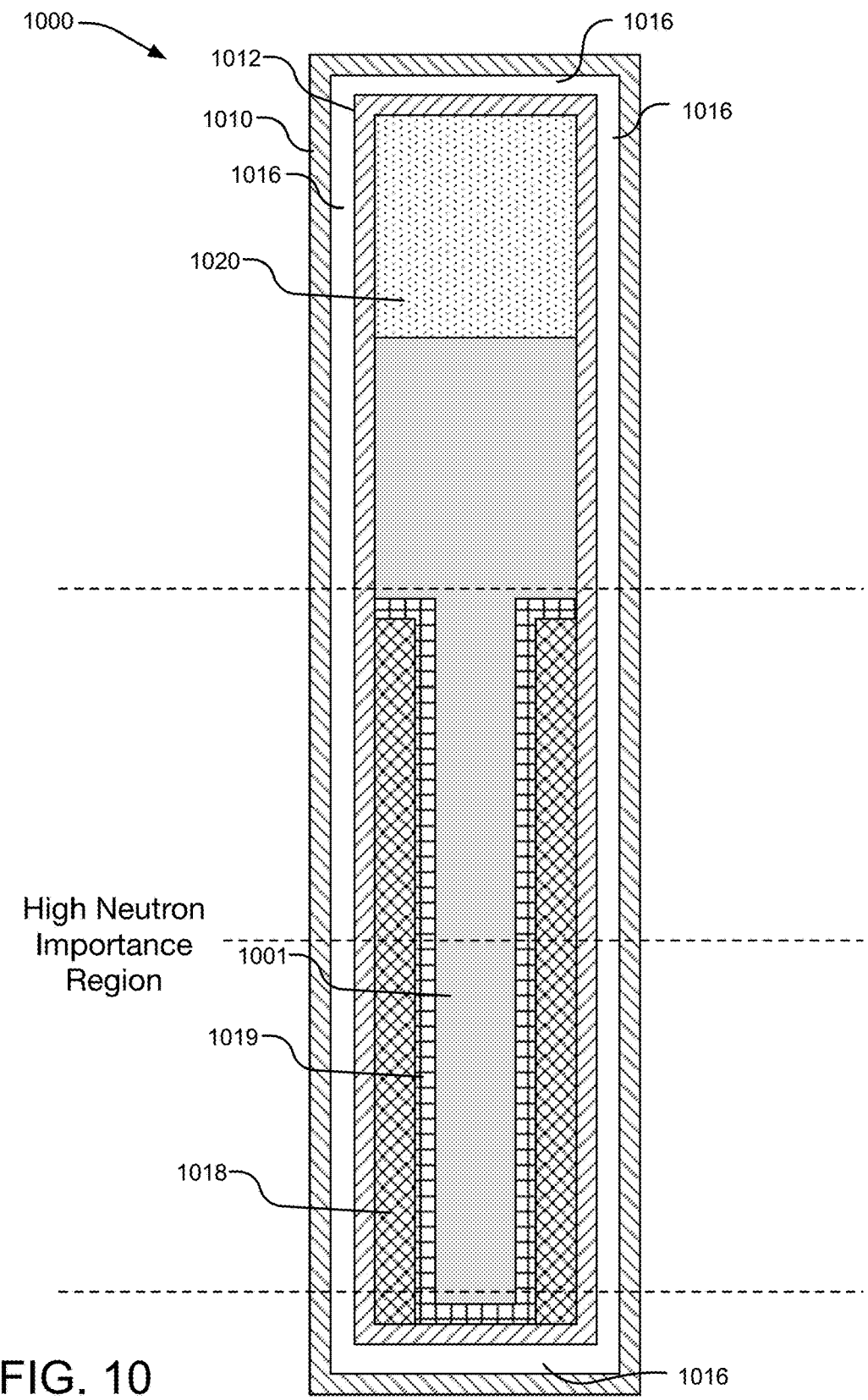
FIG. 10 illustrates a cross-sectional view of an example passive reactivity control nuclear fuel device in which liquid metal fuel has expanded outside a high neutron importance region of a nuclear reactor.

FIG. 10 illustrates a cross-sectional view of an example passive reactivity control nuclear fuel device in which liquid metal fuel 1001 has expanded outside a high neutron importance region of a nuclear reactor core. The passive reactivity control nuclear fuel device may include a duct (not shown) through which coolant, such as molten sodium, can flow. The duct may be manufactured from HT9 stainless steel although other materials may be employed.

In one implementation, a multiple-walled fuel chamber 1000 includes an outer wall chamber 1010 of the multiple-walled fuel chamber 1000 that primarily includes HT9 stainless steel, although other materials may be employed, at least in part. Further, in one implementation, an inner wall chamber 1012 of the multiple-walled fuel chamber 1000 primarily includes molybdenum, although other materials may be employed, at least in part. A gap region 1016 between the inner wall chamber 1012 and the outer wall chamber 1010 may contain a vacuum or a gas, such as a tag gas that can be detected if the outer wall chamber 1010 mechanically fails and potentially compromises the molten fuel storage. The gap region 1016 between the outer wall chamber 1010 and the inner wall chamber 1012 thermally isolates the inner wall chamber 1012, such as from thermal communication with the coolant. The flow temperature of the heat conducting fluid or coolant is typically less than the temperatures inside the inner wall chamber during a nuclear reaction.

The multiple-walled fuel chamber 1000 contains fertile nuclear fuel 1018 within the inner wall chamber 1012, such as $^{238}$U (uranium) in a porous, powdered, or suspension form. The fertile nuclear fuel 1018 is separated from the fissile nuclear fuel region containing a liquid metal fuel 1001, such as Mg—Pu, by a permeable barrier 1019, although liquid metal fuel 1001 may reside on either side of the permeable barrier 1019. As the fertile nuclear fuel 1018 is transmuted into fissile nuclear fuel by fast spectrum neutrons resulting from fission reactions with the nuclear reactor (and potentially from within the multiple-walled fuel chamber 1000 itself), the transmuted fissile nuclear fuel diffuses into solution with the liquid metal fuel 1001. In the state shown in FIG. 10, the liquid metal fuel 1001 is in an intermediate state (e.g., after sufficient heat has been provided to the liquid metal fuel 1001 to maintain the molten state of the liquid metal fuel 1001) to further expand the liquid metal fuel 1001 such that a considerable volume of the liquid metal fuel 1001 is located outside the high neutron importance region of the nuclear reactor core. By removing a considerable volume of liquid metal fuel 1001 outside the high neutron importance region, the passive reactivity control nuclear fuel device reduces reactivity within the nuclear reactor core.

A plenum region 1020 is also located within the inner wall chamber 1012 to receive gaseous fission products as well as molten fuel as the fuel temperature rises and the fuel material expands into the plenum or plenum region 1020. As shown, at least a portion of the plenum region 1020 is located outside the high neutron importance region of the nuclear reactor core. Thus, as molten fuel expands into the plenum region 1020 (and out of the high neutron importance region), reactivity in the nuclear reactor core decreases.

It should be understood that an alternative implementation similar to those illustrated in FIGS. 9 and 10 may not employ a permeable membrane. For example, a solid slug or a solid, porous slug of fertile material may be employed such that the fertile material generally maintains its shape and location without the aid of a permeable membrane.

Figure 11:
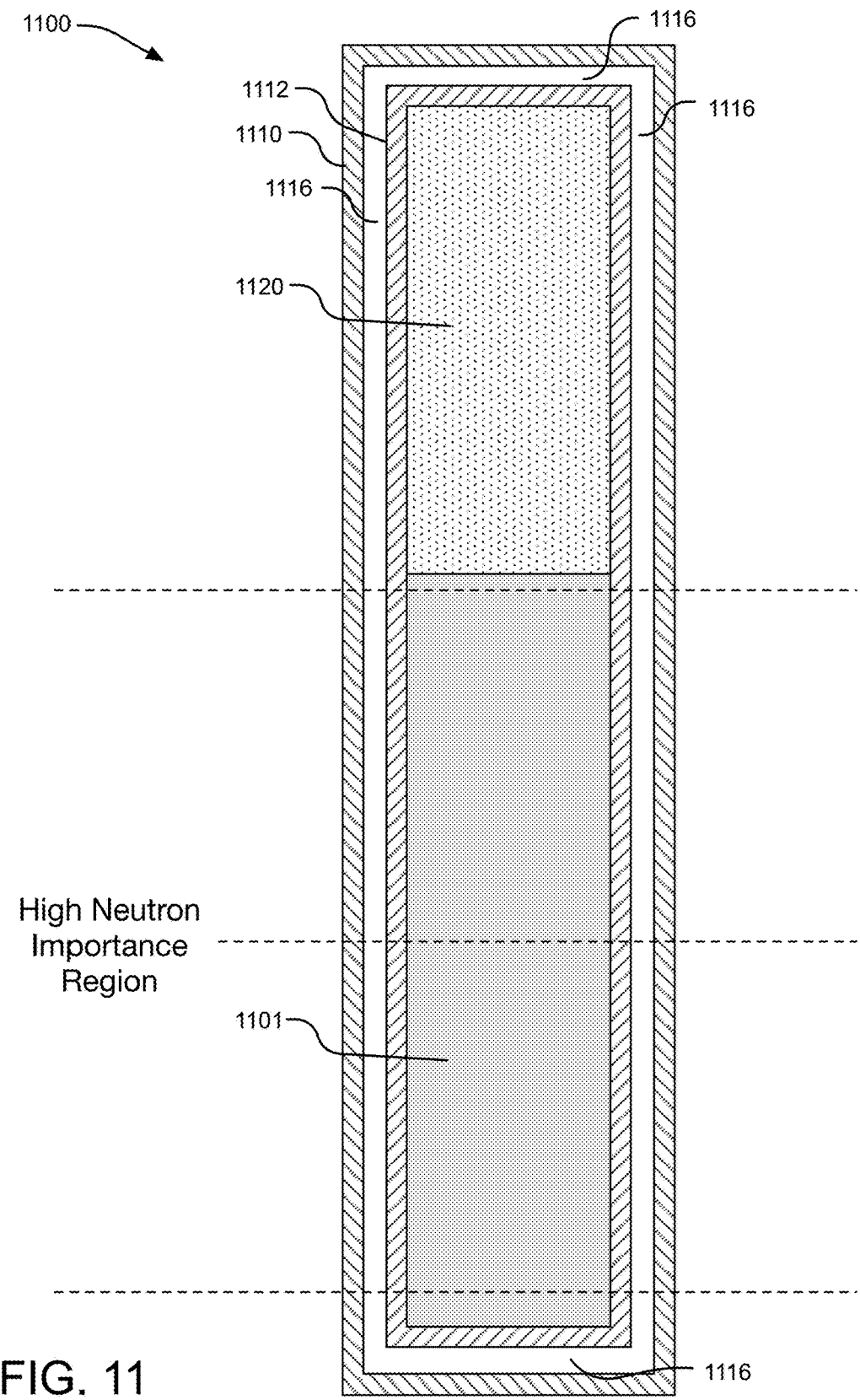
FIG. 11 illustrates a cross-section view of another alternative example passive reactivity control nuclear fuel device.

FIG. 11 illustrates a cross-sectional view of another alternative example passive reactivity control nuclear fuel device. The passive reactivity control nuclear fuel device may include a duct (not shown) through which coolant, such as molten sodium, can flow. The duct may be manufactured from HT9 stainless steel although other materials may be employed.

In one implementation, a multiple-walled fuel chamber 1100 includes an outer wall chamber 1110 of the multiple-walled fuel chamber 1100 that primarily includes HT9 stainless steel, although other materials may be employed, at least in part. Further, in one implementation, an inner wall chamber 1112 of the multiple-walled fuel chamber 1100 primarily includes molybdenum, although other materials may be employed, at least in part. A gap region 1116 between the inner wall chamber 1112 and the outer wall chamber 1110 may contain a vacuum or a gas, such as a tag gas that can be detected if the outer wall chamber 1110 mechanically fails and potentially compromises the molten fuel storage. The gap region 1116 between the outer wall chamber 1110 and the inner wall chamber 1112 thermally isolates the inner wall chamber 1112, such as from thermal communication with the coolant. The flow temperature of the heat conducting fluid or coolant is typically less than the temperatures inside the inner wall chamber during a nuclear reaction.

The multiple-walled fuel chamber 1100 contains liquid metal fuel 1101 within the inner wall chamber 1112, such as Mg—Pu. In the state shown in FIG. 11, the liquid metal fuel 1101 is in an intermediate state (e.g., after sufficient heat has been provided to the liquid metal fuel 1101 to maintain the molten state of the liquid metal fuel), but the liquid metal fuel 1101 has not expanded significantly outside the high neutron importance region of the nuclear reactor core.

A plenum region 1120 is also located within the inner wall chamber 1112 to receive gaseous fission products as well as molten fuel as the fuel temperature rises and the fuel material expands into the plenum or plenum region 1120. As shown, at least a portion of the plenum region 1120 is located outside the high neutron importance region of the nuclear reactor core. Thus, as molten fuel expands into the plenum region 1120 (and out of the high neutron importance region), reactivity in the nuclear reactor core decreases.

Figure 12:
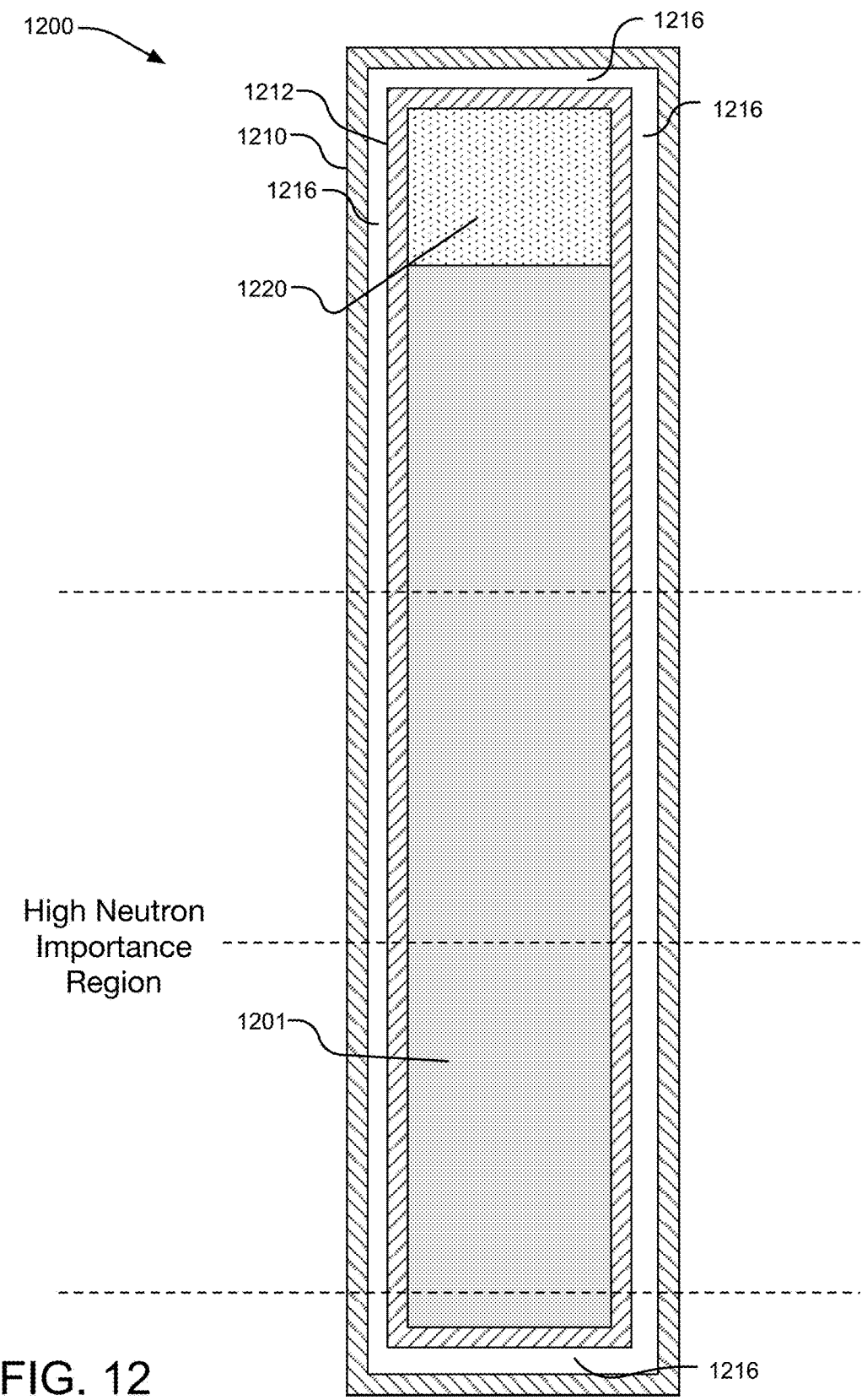
FIG. 12 illustrates a cross-sectional view of another alternative example passive reactivity control nuclear fuel device in which liquid metal fuel has expanded outside a high neutron importance region of a nuclear reactor.

FIG. 12 illustrates a cross-sectional view of another alternative example passive reactivity control nuclear fuel device in which liquid metal fuel 1201 has expanded outside a high neutron importance region of a nuclear reactor core. The passive reactivity control nuclear fuel device may include a duct (not shown) through which coolant, such as molten sodium, can flow. The duct may be manufactured from HT9 stainless steel although other materials may be employed.

In one implementation, a multiple-walled fuel chamber 1200 includes an outer wall chamber 1210 of the multiple-walled fuel chamber 1200 that primarily includes HT9 stainless steel, although other materials may be employed, at least in part. Further, in one implementation, an inner wall chamber 1212 of the multiple-walled fuel chamber 1200 primarily includes molybdenum, although other materials may be employed, at least in part. A gap region 1216 between the inner wall chamber 1212 and the outer wall chamber 1210 may contain a vacuum or a gas, such as a tag gas that can be detected if the outer wall chamber 1210 mechanically fails and potentially compromises the molten fuel storage. The gap region 1216 between the outer wall chamber 1210 and the inner wall chamber 1212 thermally isolates the inner wall chamber 1212, such as from thermal communication with the coolant. The flow temperature of the heat conducting fluid or coolant is typically less than the temperatures inside the inner wall chamber during a nuclear reaction.

The multiple-walled fuel chamber 1200 contains liquid metal fuel 1201 within the inner wall chamber 1212, such as Mg—Pu. In the state shown in FIG. 12, the liquid metal fuel 1201 is in an intermediate state (e.g., after sufficient heat has been provided to the liquid metal fuel 1201 to maintain the molten state of the liquid metal fuel), and the liquid metal fuel 1201 has expanded significantly outside the high neutron importance region of the nuclear reactor core. By removing a considerable volume of liquid metal fuel 1201 outside the high neutron importance region, the passive reactivity control nuclear fuel device reduces reactivity within the nuclear reactor core.

A plenum region 1220 is also located within the inner wall chamber 1212 to receive gaseous fission products as well as molten fuel as the fuel temperature rises and the fuel material expands into the plenum or plenum region. As shown, at least a portion of the plenum region 1220 is located outside the high neutron importance region of the nuclear reactor core. Thus, as molten fuel expands into the plenum region 1220 (and out of the high neutron importance region), reactivity in the nuclear reactor core decreases.

Note that FIGS. 11 and 12 depict implementations that do not include fertile nuclear fuel within the inner wall chamber of the multiple-walled fuel chamber. While not explicitly described, other implementations of the described technology, such as that illustrated and described with regard to FIG. 3 may also be implemented without fertile nuclear fuel within the inner wall chamber of the multiple-walled fuel chamber.

Figure 13:
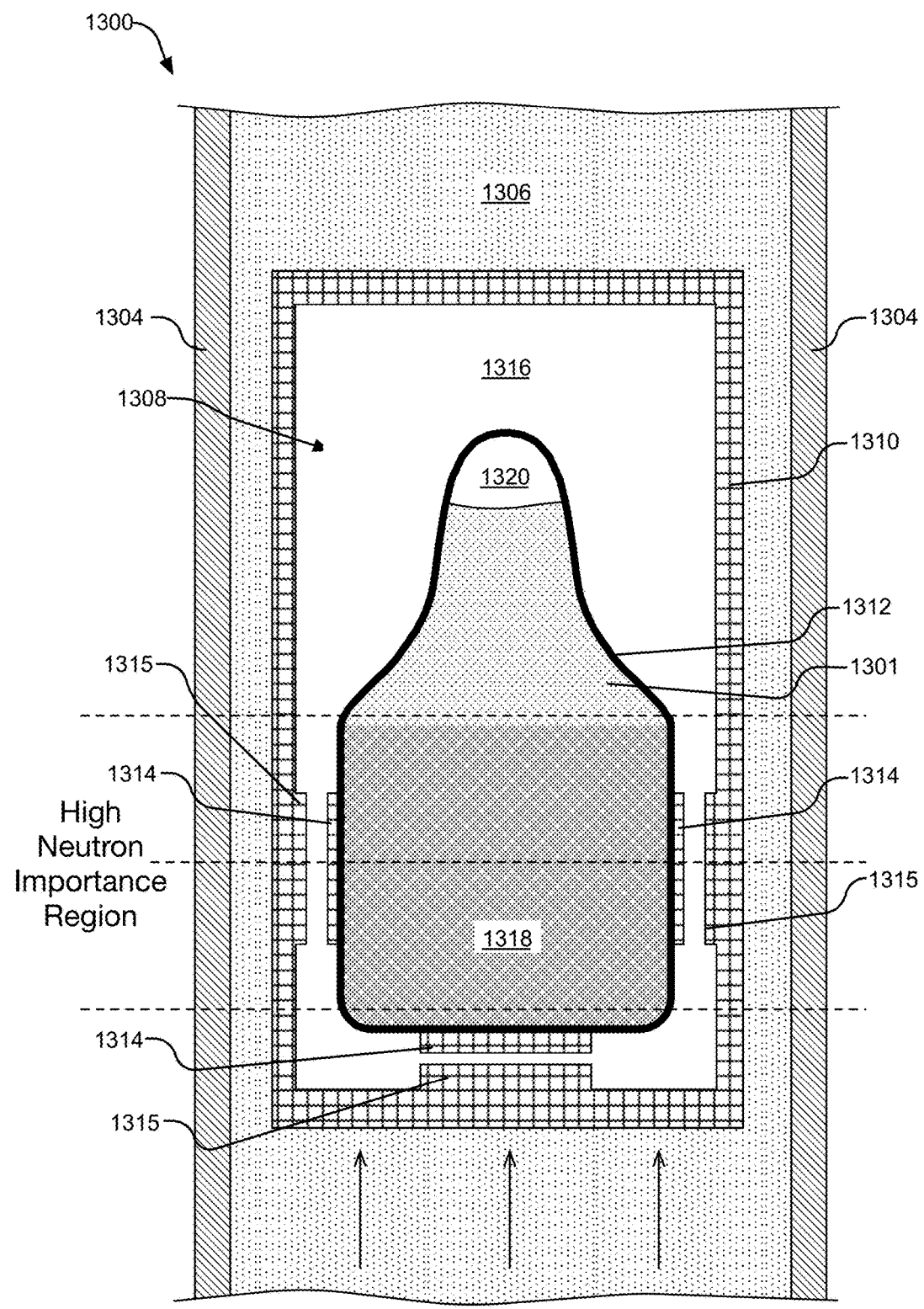
FIG. 13 illustrates a cross-sectional view of an example passive reactivity control nuclear fuel device including an alternative plenum shape in an inner wall chamber.

FIG. 13 illustrates a cross-sectional view of an example passive reactivity control nuclear fuel device 1300 including an alternatively shaped plenum region 1320 in an inner wall chamber 1312. Molten fuel 1301 has expanded outside a high neutron importance region of a nuclear reactor core and into the plenum region 1320. A solid porous fuel slug as nuclear fuel 1318 resides in the example passive reactivity control nuclear fuel device 1300, such that the molten fuel 1301 can pass through the pores of the nuclear fuel 1318. The passive reactivity control nuclear fuel device 1300 includes a duct 1304 through which coolant 1306, such as molten sodium, can flow. The duct 1304 may be manufactured from HT9 stainless steel although other materials may be employed.

The duct 1304 also contains a multiple-walled fuel chamber 1308. In one implementation, an outer wall chamber 1310 of the multiple-walled fuel chamber 1308 primarily includes HT9 stainless steel, although other materials may be employed, at least in part. Further, in one implementation, the inner wall chamber 1312 of the multiple-walled fuel chamber 1308 primarily includes molybdenum, although other materials may be employed, at least in part. In one implementation, the inner wall chamber 1312 is fitted with one or more contacts 1314, which may also be formed from HT9 stainless steel or other materials. The contacts 1314 can improve thermal communication between the inner wall chamber 1312 and the outer wall chamber 1310 (and therefore, the coolant 1306) as one or more of the contacts 1314 approach and/or physically contact the outer wall chamber 1310. Corresponding contacts 1315 on the interior of the outer wall chamber 1310 may also be provided, as shown. The gap region 1316 between the inner wall chamber 1312 and the outer wall chamber 1310 may contain a vacuum or a gas, such as a tag gas that can be detected if the outer wall chamber 1310 mechanically fails and potentially compromises the molten fuel storage. The gap region 1316 between the outer wall chamber 1310 and the inner wall chamber 1312 thermally isolates the inner wall chamber 1312, such as from thermal communication with the coolant. The flow temperature of the heat conducting fluid or coolant is typically less than the temperatures inside the inner wall chamber during a nuclear reaction.

The multiple-walled fuel chamber 1308 contains nuclear fuel 1318 within the inner wall chamber 1312. In the state shown in FIG. 13, the nuclear fuel 1318 is in an intermediate state in which the molten fuel 1301 is heated to a high enough temperature that the molten fuel 1301 expands within the inner wall chamber 1312, into a plenum region 1320, but not enough to cause a large enough increase in temperature to cause the inner wall chamber 1312 to thermally expand significantly.

It is noted that the nuclear fuel 1318 includes solid fertile nuclear fuel and molten fissile fuel (e.g., a solution of fissile nuclear fuel and the carrier material). The molten state of the fissile fuel demonstrates that the temperature of the nuclear fuel 1318 has exceeded the melting temperature of the nuclear fuel 1318 and the position of the molten fuel 1301 both within and outside the high neutron importance region of the nuclear reactor core demonstrates that the temperature of the nuclear fuel 1301 has satisfied the negative reactivity feedback expansion temperature condition.

The plenum region 1320 is also located within the inner wall chamber 1312 to receive gaseous fission products as well as molten fuel 1301 as the fuel temperature rises and the fuel material expands into the plenum or plenum region 1320. As shown, at least a portion of the plenum region 1320 is located outside the high neutron importance region. Thus, as molten fuel expands into the plenum region 1320 (and out of the high neutron importance region), reactivity in the nuclear reactor core decreases. The plenum region 1320 is shown as somewhat tapered, such that the diameter of the plenum region 1320 decreases as the distance from the high neutron importance region increases. Because the plenum region 1320 has a smaller diameter than the inner wall chamber diameter within the high neutron importance region, the plenum region 1320 allows the molten fuel 1301 to expand farther away from the high neutron importance region than a plenum region having a larger diameter, under the same temperature conditions. Other plenum configurations are contemplated.

An example passive reactivity control nuclear fuel device as described, for example, with regard to FIG. 2 represents device locatable within a nuclear reactor core. In alternative implementations, however, a passive reactivity control nuclear fuel device can be manufactured on a larger scale to form a substantial volume of a nuclear reactor vessel. In such an implementation, for example, a passive reactivity control nuclear fuel device can be manufactured such that the primary nuclear reactor core is located within the inner wall chamber and molten fuel can be moved out of a high neutron importance region within the inner wall chamber to a region of lower neutron importance region through thermal expansion of the thermal fuel to provide negative reactivity feedback. Likewise, cooling the molten fuel such that the removed molten fuel moves back into the high neutron importance region can provide positive reactivity feedback in such a large-scale passive reactivity control nuclear fuel device.

The above specification, examples, and data provide a complete description of the structure and use of exemplary implementations of the invention. Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A passive reactivity control nuclear fuel device for a nuclear reactor core, the passive reactivity control nuclear fuel device comprising:
a multiple-walled fuel chamber including
an inner wall chamber configured to position nuclear fuel in a molten fuel state within a high neutron importance region of the nuclear reactor core, the inner wall chamber being further configured to allow at least a portion of the nuclear fuel to move in a molten fuel state into a lower neutron importance region of the nuclear reactor core while remaining within the inner wall chamber as temperature of the nuclear fuel satisfies a negative reactivity feedback expansion temperature condition, the movement of the nuclear fuel in a molten fuel state to the lower neutron importance region increasing negative reactivity feedback in the nuclear reactor core, and
an outer wall chamber containing the inner wall chamber, a gap between the outer wall chamber and the inner wall chamber thermally isolating the inner wall chamber.

2. The passive reactivity control nuclear fuel device of claim 1 further wherein thermal isolation of the inner wall chamber contributes to maintaining the nuclear fuel in a molten state.

3. The passive reactivity control nuclear fuel device of claim 1 further comprising:
a duct containing the outer wall chamber and configured to flow a heat conducting fluid through the duct and in thermal communication with the outer wall chamber.

4. The passive reactivity control nuclear fuel device of claim 1, wherein movement of the nuclear fuel in a molten fuel state to the lower neutron importance region of the nuclear reactor core decreases reactivity within the nuclear reactor core.

5. The passive reactivity control nuclear fuel device of claim 1, wherein the nuclear fuel is stored in a solid fuel state within the inner wall chamber when temperature of the nuclear fuel does not satisfy a nuclear fuel melting temperature condition.

6. The passive reactivity control nuclear fuel device of claim 1, wherein the melting temperature of the nuclear fuel exceeds a flow temperature of a heat conducting fluid within a duct containing the outer wall chamber.

7. The passive reactivity control nuclear fuel device of claim 1, wherein the inner wall chamber is expandable under increased internal temperature of the inner wall chamber.

8. The passive reactivity control nuclear fuel device of claim 1, wherein the nuclear fuel includes a solid porous fertile nuclear fuel and a bonding material.

9. The passive reactivity control nuclear fuel device of claim 1, wherein the nuclear fuel includes solid porous fertile nuclear fuel, a bonding material, and fissile nuclear fuel.

10. The passive reactivity control nuclear fuel device of claim 1, wherein the nuclear fuel in a molten fuel state includes a solution of fissile nuclear fuel and a nuclear translucent carrier medium, the nuclear translucent carrier medium being formed from a melted bonding material.

11. The passive reactivity control nuclear fuel device of claim 1, wherein the inner wall chamber is not in physical contact with the outer wall chamber when the inner wall chamber has not expanded under increased internal temperature of the inner wall chamber.

12. The passive reactivity control nuclear fuel device of claim 1, wherein the inner wall chamber radiates heat from within the inner wall chamber to a heat conducting fluid flowing outside the outer wall chamber when the inner wall chamber has expanded under increased internal temperature of the inner wall chamber.

13. The passive reactivity control nuclear fuel device of claim 1, wherein the inner wall chamber conducts heat from within the inner wall chamber to a heat conducting fluid flowing outside the outer wall chamber when the inner wall chamber has expanded to physically contact the outer wall chamber under increased internal temperature of the inner wall chamber.

14. The passive reactivity control nuclear fuel device of claim 1, wherein the inner wall chamber conducts heat from within the inner wall chamber to a heat conducting fluid flowing outside the outer wall chamber when the inner wall chamber has expanded to allow physical contact between the outer wall chamber and contacts affixed to the inner wall chamber under increased internal temperature of the inner wall chamber.

15. The passive reactivity control nuclear fuel device of claim 1, wherein transfer of heat from the inner wall chamber to a heat conducting fluid flowing outside the outer wall chamber reduces the temperature of the nuclear fuel and transitions the nuclear fuel to a solid fuel state.

16. The passive reactivity control nuclear fuel device of claim 1, further comprising:
one or more thermally conductive contacts affixed to the inner wall chamber and in thermal communication with the nuclear fuel, the thermally conductive contacts configured to physically contact the outer wall chamber when the inner wall chamber expands.

17. The passive reactivity control nuclear fuel device of claim 1, wherein the inner wall chamber conducts heat from within the inner wall chamber to a heat conducting fluid flowing outside the outer wall chamber when the inner wall chamber has expanded to physically contact the outer wall chamber under increased internal temperature of the inner wall chamber.

18. The passive reactivity control nuclear fuel device of claim 1, wherein a gap between the inner wall chamber and the outer wall chamber is filled at least in part by a tag gas.

19. The passive reactivity control nuclear fuel device of claim 1, wherein the inner wall chamber includes a plenum into which the nuclear fuel in a molten fuel state expands as temperature of the nuclear fuel in the molten fuel state increases.

20. A nuclear reactor having a nuclear reactor core comprising:
a passive reactivity control nuclear fuel device located in the nuclear reactor core, the passive reactivity control nuclear fuel device including
a multiple-walled fuel chamber including
an inner wall chamber configured to position nuclear fuel in a molten fuel state within a high neutron importance region of the nuclear reactor core, the inner wall chamber being further configured to allow at least a portion of the nuclear fuel to move in a molten fuel state into a lower neutron importance region of the nuclear reactor core while remaining within the inner wall chamber as temperature of the nuclear fuel satisfies a negative reactivity feedback expansion temperature condition, the movement of the nuclear fuel in a molten fuel state to the lower neutron importance region increasing negative reactivity feedback in the nuclear reactor core, and
an outer wall chamber containing the inner wall chamber, a gap between the outer wall chamber and the inner wall chamber thermally isolating the inner wall chamber; and
a duct containing the multiple-walled fuel chamber and configured to flow a heat conducting fluid through the duct and in thermal communication with the outer wall chamber.

21. The nuclear reactor of claim 20, wherein movement of the nuclear fuel in a molten fuel state into the lower neutron importance region of the nuclear reactor core decreases reactivity within the nuclear reactor core.

22. The nuclear reactor of claim 20, wherein the nuclear fuel is stored in a solid fuel state within the inner wall chamber when temperature of the nuclear fuel does not satisfy a nuclear fuel melting temperature condition.

23. The nuclear reactor of claim 20, wherein the melting temperature of the nuclear fuel exceeds a flow temperature of the heat conducting fluid within the duct.

24. The nuclear reactor of claim 20, wherein the inner wall chamber is expandable under temperature of the inner wall chamber.

25. The nuclear reactor of claim 20, wherein the inner wall chamber is not in physical contact with the outer wall chamber when the inner wall chamber has not expanded under increased internal temperature of the inner wall chamber.

26. The nuclear reactor of claim 20, wherein the inner wall chamber radiates heat from within the inner wall chamber to the heat conducting fluid flowing outside the outer wall chamber when the inner wall chamber has expanded under increased internal temperature of the inner wall chamber.

27. The nuclear reactor of claim 20, wherein the inner wall chamber conducts heat from within the inner wall chamber to the heat conducting fluid flowing outside the outer wall chamber when the inner wall chamber has expanded to physically contact the outer wall chamber under increased internal temperature of the inner wall chamber.

28. The nuclear reactor of claim 20, wherein the inner wall chamber conducts heat from within the inner wall chamber to the heat conducting fluid flowing outside the outer wall chamber when the inner wall chamber has expanded to allow physical contact between the outer wall chamber and contacts affixed to the inner wall chamber under increased internal temperature of the inner wall chamber.

29. The nuclear reactor of claim 20, wherein transfer of heat from the inner wall chamber to the heat conducting fluid flowing outside the outer wall chamber reduces the temperature of the nuclear fuel and transitions the nuclear fuel to a solid fuel state.

30. A nuclear reactor having a nuclear reactor core comprising:
a multiple-walled fuel chamber including
an inner wall chamber configured to contain the nuclear reactor core and to position nuclear fuel in a molten fuel state within a high neutron importance region of the nuclear reactor core, the inner wall chamber being further configured to allow at least a portion of the nuclear fuel to move in a molten fuel state into a lower neutron importance region of the nuclear reactor core while remaining within the inner wall chamber as temperature of the nuclear fuel satisfies a negative reactivity feedback expansion temperature condition, the movement of the nuclear fuel in a molten fuel state to the lower neutron importance region increasing negative reactivity feedback in the nuclear reactor core, and
an outer wall chamber containing the inner wall chamber, a gap between the outer wall chamber and the inner wall chamber thermally isolating the inner wall chamber.

* * * * *